United States Patent
Reynolds

(10) Patent No.: US 7,894,122 B2
(45) Date of Patent: Feb. 22, 2011

(54) FREQUENCY-SHIFTING MICRO-MECHANICAL OPTICAL MODULATOR

(76) Inventor: Meritt Reynolds, 4794 Fernglen Drive, Burnaby, BC (CA) V5G 3V7

(*) Notice: Subject to any disclaimer, the term of this patent is extended or adjusted under 35 U.S.C. 154(b) by 63 days.

(21) Appl. No.: 12/368,137

(22) Filed: Feb. 9, 2009

(65) Prior Publication Data

US 2009/0268271 A1 Oct. 29, 2009

Related U.S. Application Data

(60) Provisional application No. 61/027,411, filed on Feb. 8, 2008.

(51) Int. Cl.
G02B 26/00 (2006.01)

(52) U.S. Cl. .................. 359/291; 359/290

(58) Field of Classification Search ............ 359/290, 359/291, 295, 298, 223, 224, 572, 573
See application file for complete search history.

(56) References Cited

U.S. PATENT DOCUMENTS

| | | | |
|---|---|---|---|
| 3,431,504 A | 3/1969 | Adler | |
| 3,796,480 A | 3/1974 | Preston, Jr. et al. | |
| 3,938,881 A | 2/1976 | Biegelsen et al. | |
| 4,157,863 A | 6/1979 | Clark | |
| 4,886,964 A | 12/1989 | Pritchard et al. | |
| 4,927,245 A | 5/1990 | Papuchon et al. | |
| 5,262,889 A | 11/1993 | Fink | |
| 5,311,360 A | 5/1994 | Bloom et al. | |
| 5,652,672 A | 7/1997 | Huignard et al. | |
| 6,108,117 A | 8/2000 | Furlani et al. | |
| 6,243,194 B1 * | 6/2001 | Brazas, Jr. et al. | .......... 359/290 |
| 6,618,187 B2 | 9/2003 | Pilossof | |
| 6,707,591 B2 | 3/2004 | Amm | |
| 6,829,077 B1 * | 12/2004 | Maheshwari | ............ 359/291 |
| 6,829,092 B2 | 12/2004 | Amm et al. | |
| 6,987,616 B2 * | 1/2006 | Tamada et al. | ............. 359/573 |
| 7,054,054 B1 | 5/2006 | Srinivasan et al. | |
| 7,113,320 B2 * | 9/2006 | Tanner | .............. 359/290 |
| 7,202,988 B1 | 4/2007 | Payne et al. | |
| 7,215,461 B1 | 5/2007 | Leung et al. | |
| 7,231,102 B2 | 6/2007 | Ridgway | |
| 2002/0195418 A1 * | 12/2002 | Kowarz et al. | ............. 216/13 |
| 2007/0127932 A1 | 6/2007 | Qi et al. | |
| 2007/0251916 A1 * | 11/2007 | Akahane et al. | ............. 216/27 |

(Continued)

OTHER PUBLICATIONS

Kuck, H., et al., "Deformable Micromirror Devices as Phase Modulating High Resolution Light Valves", The 8th International Conference on Solid-State Sensors and Actuators, and Eurosensors IX, Stockholm, Sweden, Jun. 25-29, 1995, pp. 301-304.

(Continued)

*Primary Examiner*—Timothy J Thompson
(74) *Attorney, Agent, or Firm*—Oyen Wiggs Green & Mutala LLP

(57) ABSTRACT

An apparatus for shifting the frequency of light comprises a modulator comprising one or more light-reflective elements. The elements are arranged in N groups that are interleaved along the surface of the modulator. The elements are deflected in time in a periodic sawtooth or sinusoidal N-phase manner. The frequency shift can be varied continuously and quickly. Such a modulator may be operated at zero frequency shift, to produce an optical phase shift.

33 Claims, 13 Drawing Sheets

U.S. PATENT DOCUMENTS

2008/0055557 A1* 3/2008 Yavid et al. .................... 353/31
2008/0080042 A1* 4/2008 Yang et al. ................... 359/297

OTHER PUBLICATIONS

Corrigan, R., et al., "Silicon Light Machines—Grating Light Valve Technology Brief", Silicon Light Machines, Jun. 2001 ver. C, pp. 1-8.

Jones, P.N., et al., "A moving-mirror frequency modulator for cold atom spectroscopy", Review of Scientific Instruments, vol. 73, No. 7, 2002, pp. 2549-2551.

Payne, A., et al., "Enabling high data-rate imaging applications with grating light valve technology", presented at Photonics West 2004—Micromachining and Microfabrication Symposium, Jan. 26, 2004, San Jose, CA, pp. 1-13.

Shea, H. R., "Reliability of MEMS for space applications", Proceedings of SPIE, vol. 6111, 2006, pp. 61110A-1 to 61110A-10.

Yan, X., et al., "Analysis of Optical Collecting System for MEMS-based Grating Moving Light Modulator", Proceedings of the 1st IEEE International Conference on Nano/Micro Engineered and Molecular Systems, Jan. 18-21, 2006, Zhuhai, China, pp. 1335-1338.

Mughal, M.J. and Riza, N. A., "Compact Acoustooptic High-Speed Variable Attenuator for High-Power Applications", IEEE Photonics Technology Letters, vol. 14, No. 4, Apr. 2002, pp. 510-512.

Riza, N. A. and Yaqoob, Z., "Submicrosecond Speed Variable Optical Attenuator Using Acoustooptics", IEEE Photonics Technology Letters, vol. 13, No. 7, Jul. 2001, pp. 693-695.

Mali, R. K., et al., "Development of microelectromechanical deformable mirrors for phase modulation of light", Opt. Eng., vol. 36, No. 2, Feb. 1997, pp. 542-548.

Zhou, G. and Chan, F. S., "Nondispersive optical phase shifter array using microelectromechanical systems based gratings", Optics Express, vol. 15, No. 17, Aug. 2007, pp. 10958-10963.

Dai, C.-L., et al., "Fabrication of a micromachined optical modulator using the CMOS process", J. Micromech. Microeng., vol. 11, 2001, pp. 612-615.

Solgaard, O., et al., "Deformable grating optical modulator", Optics Letters, vol. 17, No. 9, May 1992, pp. 688-690.

Shrauger, V. and Warde, C., "Development of a high-speed, high fill-factor phase-only spatial light modulator", Proceedings of SPIE, vol. 4291, 2001, pp. 101-108.

Stevenson, W.H., "Optical Frequency Shifting by Means of a Rotating Diffraction Grating", Applied Optics, vol. 9, No. 3, Mar. 1970, pp. 649-652.

Li, K., et al., "Phased arrays of micromirrors for programmable shaping of ultrashort pulses", Wednesday Afternoon, Cleo 2001, pp. 339-340.

Zhang, X.M. et al., "Polysilicon 3D-Mirror Frequency Shifter for WDM Fibre-Optic Communication Applications", IEEE, pp. 79-80, 2000.

* cited by examiner

Top view

FREQUENCY-SHIFTING MICRO-MECHANICAL OPTICAL MODULATOR

REFERENCE TO RELATED APPLICATION

This application claims the benefit of U.S. patent application No. 61/027,411 filed on 8 Feb. 2008 and entitled FREQUENCY-SHIFTING MICRO-MECHANICAL OPTICAL MODULATOR under 35 U.S.C. §119, which is hereby incorporated by reference herein.

TECHNICAL FIELD

The invention relates to the field of optics. The invention relates particularly to frequency-shifting optical modulators.

BACKGROUND

In a wide range of applications in communications, metrology and science, it is valuable to shift the frequency (and hence wavelength) of a beam of light. Example applications of frequency shifting include:
- heterodyne detection schemes as used, for example, in Doppler velocimetry.
- encoding information into a light beam through frequency modulation or frequency-shift keying.
- phase shifting.
- tuning the interaction of light with matter.
- producing moving interference patterns for use, for example, in frequency-shifting methods.
- etc.

The frequency of a laser beam can be shifted by reflection from a moving mirror (see FIG. 1). This arrangement is known as a "Doppler mirror". U.S. Pat. No. 5,262,889 discloses apparatus for shifting the frequency of a light beam in which the light beam is reflected from a rotating helical or spiral mirror to achieve a constant frequency shift. The frequency of a laser beam can be shifted by diffraction from a moving grating. In FIG. 2 the rotation of a radially ruled grating causes light in the +1 diffraction order to be shifted to a higher frequency while light in the −1 diffraction order is shifted to a lower frequency. In these methods, the mechanical inertia of the moving components prevents rapid changes in the frequency shift. Therefore, these methods are unsuitable for modulating frequency shift with a high bandwidth.

Frequency shifting may be achieved by varying an optical delay using an electro-optic modulator. Frequency can be decreased, for example, by continuously increasing the optical delay. An electro-optic modulator can be used to modulate a frequency shift with a high bandwidth.

An acousto-optic modulator (AOM) may be used for frequency-shifting. In an AOM, light passes through a transparent medium in which a sound beam is being propagated. The light is deflected by Bragg reflection from the refractive index variations induced by the sound waves. The frequency of the diffracted light is shifted by the Doppler effect because the variations are traveling waves. The generator of the sound is usually a piezoelectric crystal vibrated by a high voltage generator that can be switched on and off or varied in intensity or frequency to modulate the intensity and frequency shift of the diffracted light. The angle through which light is deflected by an AOM depends on the frequency.

Frequency shifting can be achieved by reflecting light from a surface on which a Rayleigh surface acoustic wave (SAW) is propagating. As in the case of an AOM, the Doppler effect leads to a frequency shift of the light diffracted by the wave. The generator of the waves can be switched on and off or varied in intensity or frequency to modulate the light. For reasonable generator power levels the modulation of the surface profile is much smaller than the wavelength of light and only a small fraction of the light is diffracted. An example of this is described in U.S. Pat. No. 4,157,863.

U.S. Pat. No. 7,231,102 describes the use of electro-optic traveling-wave modulators for frequency shifting. These make use of an electrical traveling wave propagating on the surface of a material within which the light propagates. Light is diffracted from a moving refractive index grating induced in the material by the Kerr effect. The artificial crystals required for such modulators makes them too expensive for some applications.

U.S. Pat. No. 4,927,245 describes a traveling grating formed in a semiconducting optical guide by means of a moving interference pattern formed by the crossing of two laser beams of differing wavelength. The traveling grating results from variations in charge carrier density induced within the optical guide.

U.S. Pat. No. 7,113,320 describes an array of ribbons which is illuminated such that each ribbon is illuminated by light of a different optical frequency. Motion of each ribbon is used to frequency modulate the frequency of the light that falls on it. This parallel configuration enables a very high data transmission rate for fiber optic communication.

There remains a need for practical and cost-effective methods and apparatus for shifting the frequency of light. There is a particular need for such methods and apparatus capable of modulating a frequency shift with a high bandwidth.

SUMMARY

One aspect of the invention provides a modulator for modulating a frequency of an incident beam of light. The modulator comprises an element having a light-reflective surface, the element movable to displace the surface in a first direction making an angle α with a direction of the incident beam of light wherein cos α>0, and, a driving system configured to oscillate the element in the first direction according to a sawtooth motion profile to produce an output beam of light having a shifted frequency.

Another aspect of the invention provides a modulator for modulating an incident beam of light comprising a plurality of elements, each element having a light-reflective surface, wherein the elements are grouped into N>2 groups such that the elements of the N groups are interleaved, means for selectively deflecting the elements of each group such that the incident beam of light is diffracted, and means of varying the deflection of the elements in time in an N-phase fashion.

Another aspect of the invention provides an apparatus comprising a plurality of elongated elements arranged parallel to one another in a one dimensional array, each element having a light-reflective surface which is moveable in a first direction, and, a driving system operatively coupled to the elements and configured to oscillate the elements in the first direction according to a periodic motion profile phase-shifted by an amount depending on a position of the element along the array such that the elements define traveling wave.

Another aspect of the invention provides a method for shifting the frequency of light in a beam of light. The method comprises directing the beam of light onto an array of movable elements that each have a light-reflective surface, the elements movable to displace the surface in a first direction making an angle α with a direction of the beam of light wherein cos α>0, and, oscillating the elements according to a periodic motion profile having a sawtooth waveform.

Another aspect of the invention provides a method for shifting the frequency of light in a beam of light comprising directing the beam of light onto elements of an array of movable elements that each have a light-reflective surface, the elements movable to displace the surface in a first direction that is not perpendicular to a direction of propagation of the light beam, and oscillating each of the elements according to a periodic motion profile phase-shifted by an amount depending on a position of the element along the array so that the elements define traveling wave.

Further aspects of the invention and details of example embodiments are discussed below.

BRIEF DESCRIPTION OF THE DRAWINGS

The accompanying drawings illustrate non-limiting example embodiments of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

One aspect of this invention provides apparatus for shifting the frequency of light. The apparatus comprises a modulator comprising one or more light-reflective elements. The elements are arranged in N groups that are interleaved along the surface of the modulator. The elements are deflected in time in a periodic sawtooth or sinusoidal N-phase manner. The frequency shift can be varied continuously and quickly. Such a modulator may be operated at zero frequency shift, to produce an optical phase shift.

A modulator suitable for use in frequency shifting may be made using micro-electro-mechanical systems (MEMS) technology. Due to their small inertia, MEMS elements can be accelerated rapidly and their motions can be readily controlled at length scales smaller than the wavelength of light. A wide range of technologies for the fabrication of MEMS devices are known in the art. Any suitable technology may be applied to fabricate modulators for embodiments of this invention. One type of MEMS technology that may be particularly well-suited to making modulators as described herein is described in Shrauger et al. *Development of a high-speed, high fill-factor phase-only spatial light modulator*, in *Diffractive and Holographic Technologies for Integrated Photonic Systems*, Richard L. Sutherland, Dennis W. Prather, Ivan Cindrich, Editors, Proceedings of SPIE Vol. 4291 (2001) which is hereby incorporated herein by reference. This article describes an array of square cells. The same technology may be used to make modulators having elongated elements arranged in a 1-d array. Rows of square cells may be driven together to emulate elongated elements.

Light reflected from a moving mirror is frequency shifted. For normal incidence the frequency shift is given by $\Delta f = 2\upsilon/\lambda$ where $\upsilon$ is the mirror velocity toward the source of the incident beam and $\lambda$ is the wavelength of the incident light. This is the well-known Doppler effect for moving mirrors.

Figure 1:
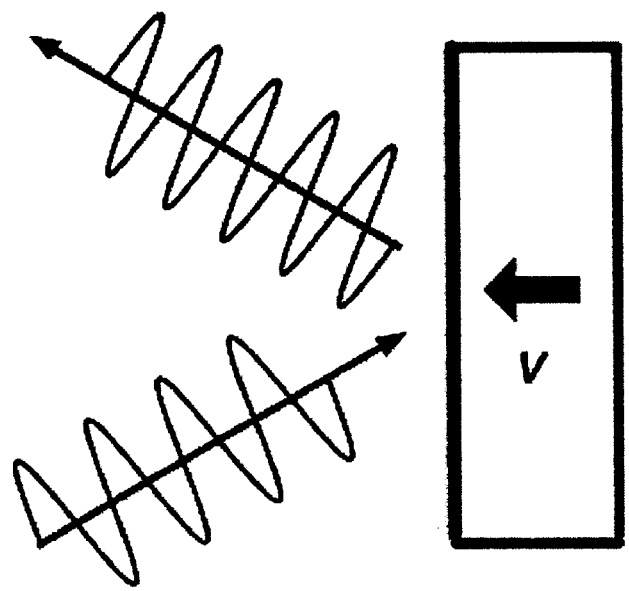
FIG. 1 is a schematic illustration showing frequency shifting a beam of light by a prior art Doppler mirror arrangement.
Figure 2:
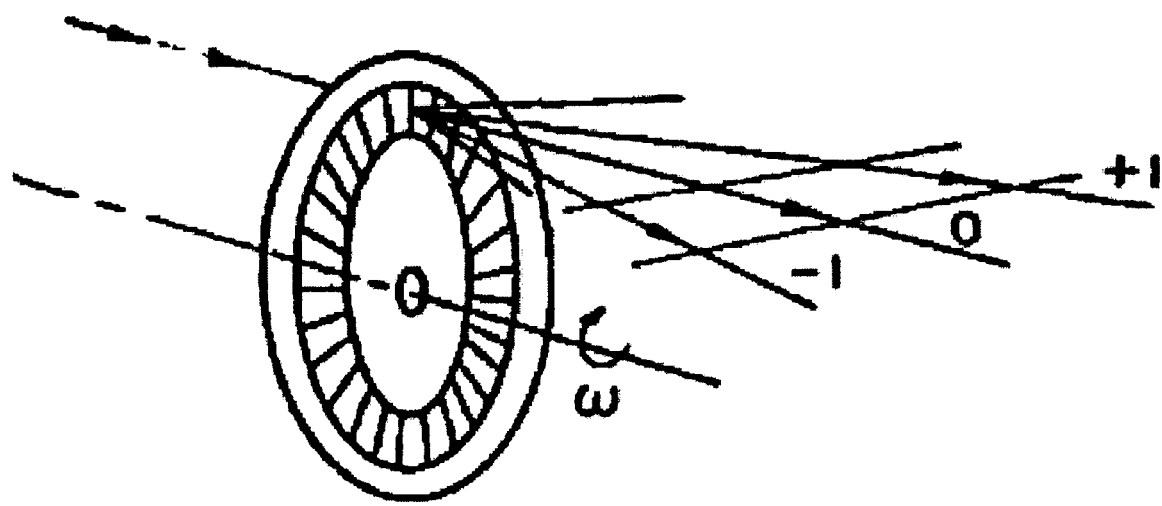
FIG. 2 is a schematic illustration showing frequency shifting a beam of light using a prior art rotating grating.
Figure 3:
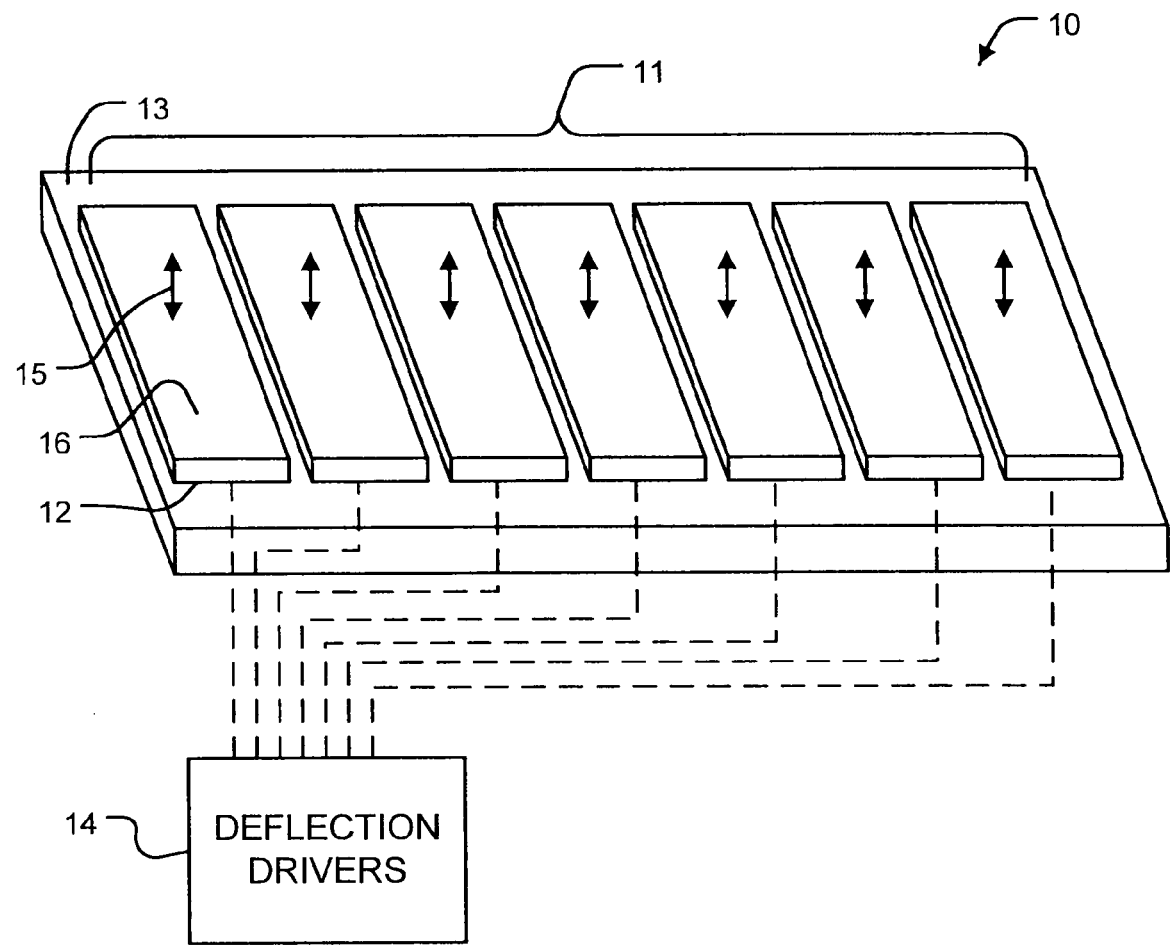
FIG. 3 is a schematic illustration of a frequency-shifting modulator according to an example embodiment of the invention.

One embodiment of the invention uses sawtooth motion of MEMS elements to impart a frequency shift to a beam of light reflected from the elements. The elements will typically be arranged in an array. FIG. 3 shows a perspective view of apparatus 10 which includes an array 11 of elements 12 supported on a substrate 13. Mechanisms 14 are provided to drive the deflection of elements 12 in a 'vertical' direction as indicated by arrows 15. Surfaces 16 of elements 12 are light-reflecting or have light-reflecting areas.

Mechanisms 14 may comprise any suitable mechanisms for moving elements 12. For example, mechanisms 14 may:
apply electrical potential differences between the elements and the substrate to create electrostatic forces to move elements 12 relative to substrate 13;
apply magnetostatic forces to elements 12;

move elements 12 by actuating piezoelectric transducers or other actuators on which elements 12 are supported or to which elements 12 are coupled.

etc.

Elements 12 may be constructed in any suitable manner. For example, elements 12 may comprise:

cantilevered elements;
elements such as ribbons supported at both ends; or
the like.

A wide range of movable elements that may be applied in apparatus 10 is described in the MEMS literature.

Figure 4A:
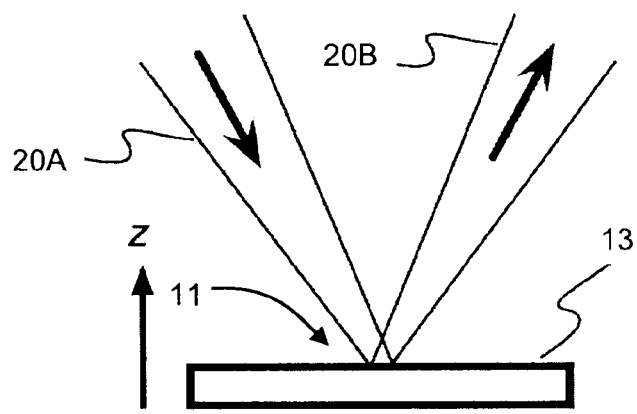
FIGS. 4A and 4B are respectively side and plan views showing apparatus for shifting the frequency of light using a modulator which may be like the modulator of FIG. 3.
Figure 4B:
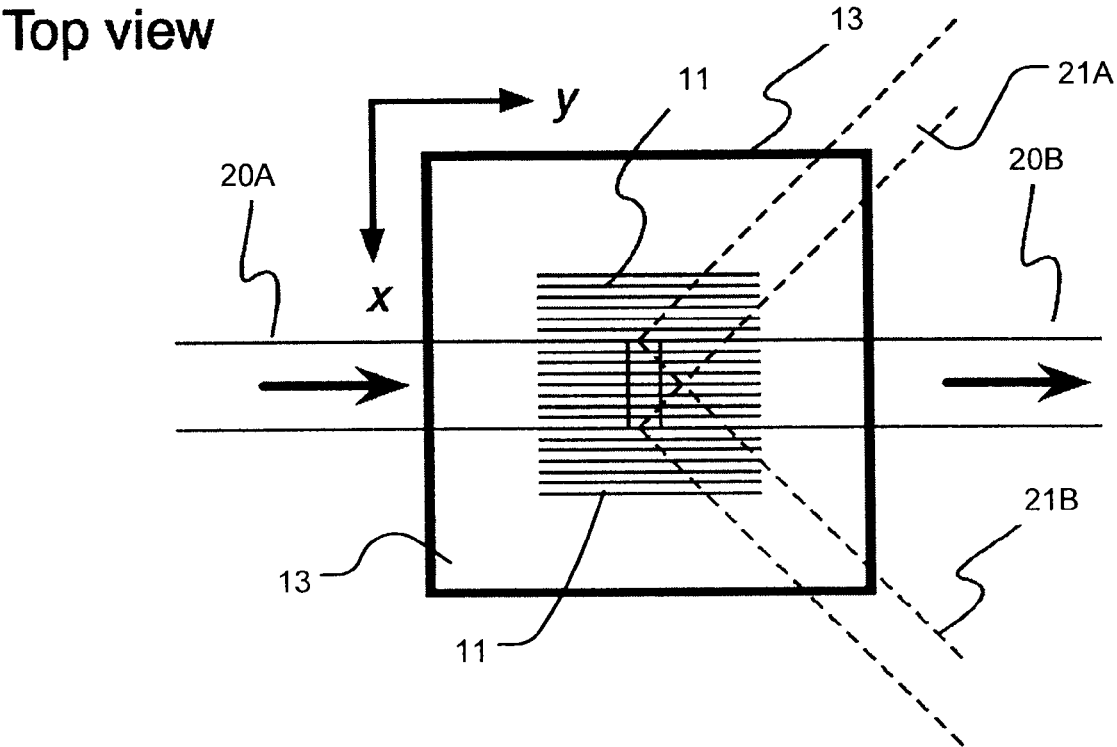

FIGS. 4A and 4B show how a MEMS frequency-shifting modulator may be illuminated. To simplify the separation of diffracted from incident light an incident beam 20A is incident obliquely on array 11. This is not mandatory, however. Incident beam 20A is shown to be converging. Incident light 20A could be collimated or diverging slightly. To achieve the best efficiency, it is desirable to provide an optical system that shapes the light in incident beam 20A to match a shape of an area in which elements 12 are located. For example:

where elements 12 are arranged in a row, the optical system may shape incident light 20A into a stripe oriented along the row of elements 12.
where elements 12 are arranged in a rectangular array, the optical system may shape incident light 20A to match a shape and size of the rectangular array.
and the like.

In some embodiments, at least 3N elements of array 11 are illuminated by incident light beam 20A where N is a number of interleaved groups of elements 12. In such cases, where elements 12 all have the same width, then the width of incident light beam 20A at array 11 is at least 3Nb where b is the pitch of elements 12 in array 11.

Incident beam 20A reflects off of the elements of array 11 to form an output beam 20B. Some light from incident beam 20A undergoes diffraction and is deflected into parasitic diffracted beams 21A and 21B. The amount of light in the specularly-reflected beam 20B is the most in the following situations:

elements 12 are quiescent (in this case, surfaces 16 of elements 12 may all lie in a common plane);
all elements 12 are controlled to move together in a sawtooth of quarter-wave amplitude (N=1, $\alpha=\lambda/4$, where $\lambda$ is the wavelength of light in incident beam 20A);
elements 12 are controlled to move in two interleaved groups in a two-phase sawtooth of half-wave amplitude (N=2, $\alpha=\lambda/2$).

For the latter two situations, reflected beam 20B is frequency shifted.

The number and size of elements 12 will depend upon the intended application and/or mode of operation. For the case N=1 a single large element may be provided. In some embodiments, elements 12 are dimensioned such that the transverse coherence length of incident light beam 20A exceeds 2Nb where b is the spacing between adjacent elements 12 (i.e. the pitch of elements 12) and N is the number of element groups. Of course, the incident light beam 20A may be expanded or focused to match array 11. For high speed operation, elements 12 should be small. In that case, to facilitate separation of diffraction orders, the elements ideally have a pitch b such that $Nb<100\lambda$.

Example Application—Elements Controlled to have Sawtooth Motion

Figure 5A:
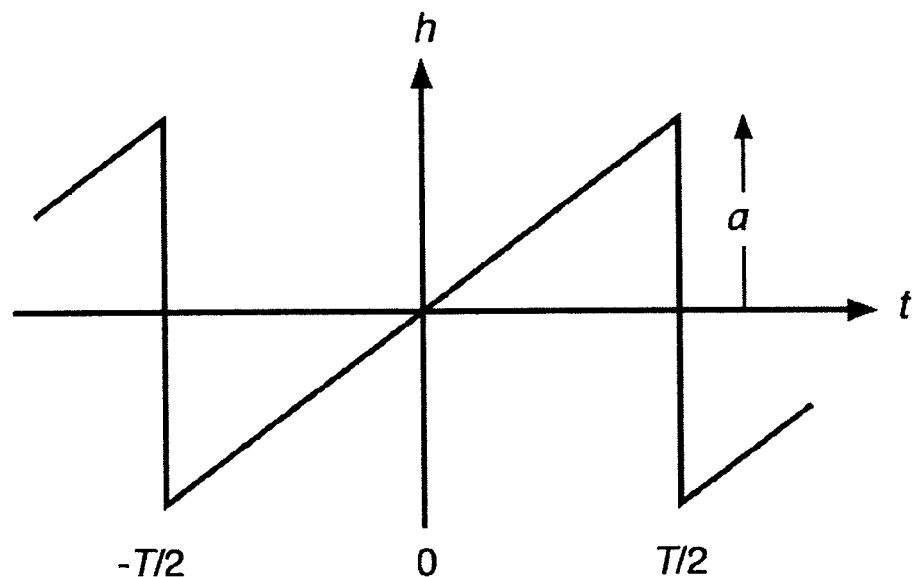
FIG. 5A shows a sawtooth motion profile that may be applied to elements of a modulator to achieve a shift in frequency of light.

Elements 12 may be controlled to move in a sawtooth motion. Consider the case where an element 12 is moved such that its height (Z-position) varies in time as a perfect sawtooth as shown in FIG. 5A. The velocity of the element 12 is constant except at the instant of retrace (or "reset"). Each element therefore imparts a frequency shift to the light reflected from it by the Doppler effect. The amplitude a of motion may be controlled to be a multiple of $\lambda/4$. In this case, during the retrace the elements move a multiple of $\lambda/2$. Under these conditions the retrace does not cause a jump in optical phase which could undesirably affect the frequency shift.

The period of the motion (retrace-to-retrace) is T. The motion is linear on the range $-T/2<t<T/2$.

Figure 5B:
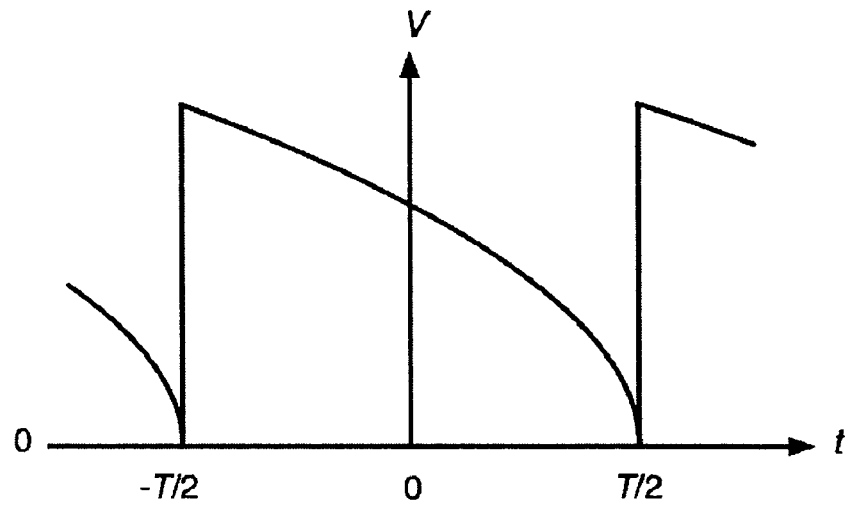
FIG. 5B is a voltage profile that may be applied to move electrostatically-driven elements according to a motion profile as shown in FIG. 5A.

In an example case where the motion of elements 12 is driven electrostatically, motion like that illustrated in FIG. 5A may be imparted to an element 12 by varying the voltage difference V between the element 12 and an adjacent part of substrate 13 so that voltage V varies in time as shown in FIG. 5B. Voltage V may, for example, vary as the square root of time. FIG. 5B is a curve representing drive voltage V as a function of time in a case where the force driving an element 12 is given by the electrostatic force law ($F \propto V^2$) and deflections are quasi-static (i.e., at low enough frequency that the equilibrium position of the element is well approximated by a linear function of applied force).

Figure 6:
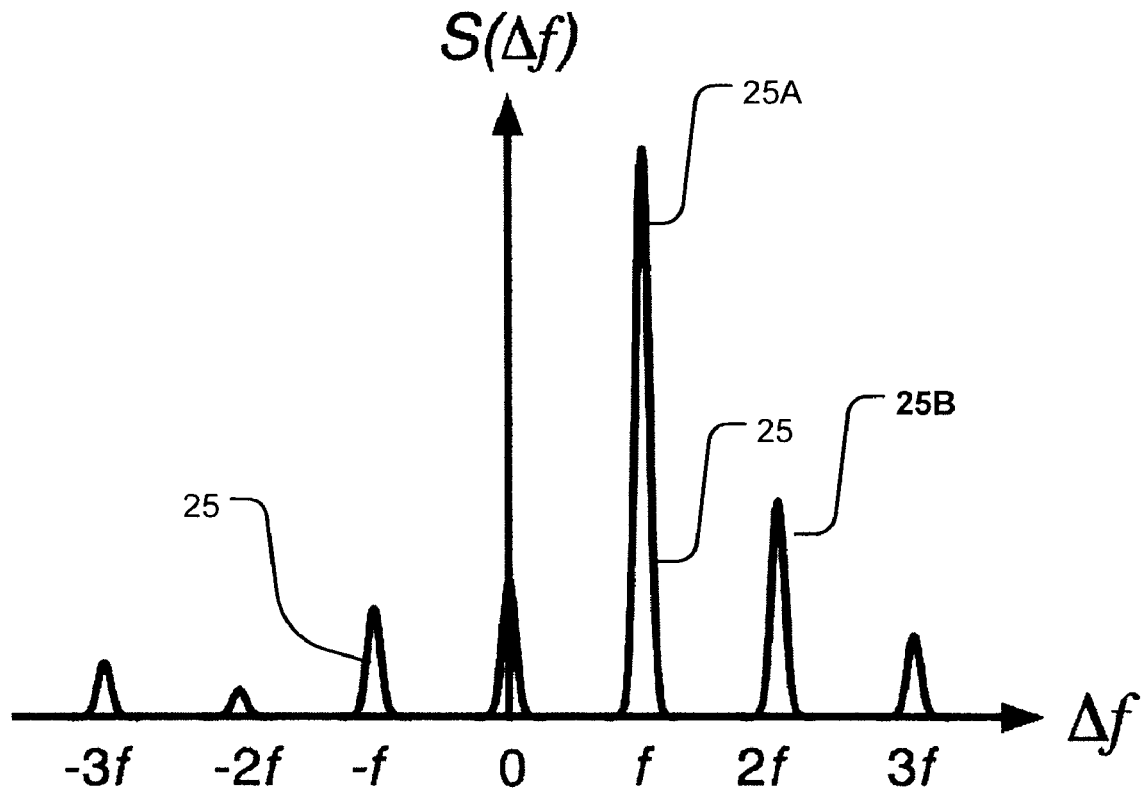
FIG. 6 shows a spectrum of frequency-shifted light.

The motion of each element 12 is periodic in time. Consequently, assuming monochromatic incident light, the frequency content of the reflected light comprises discrete narrow peaks 25 as illustrated in FIG. 6. The relative amplitude of the peaks depends on the detailed waveform of the element motion. For perfect sawtooth motion with amplitude $\lambda/4$ all of the energy is in peak 25A. Deviations from perfect sawtooth motion will cause increases in the energy of peaks other than peak 25A.

The spectral power density $S(\Delta f)$ is plotted versus the frequency shift $\Delta f$. The shifted peaks 25 appear at the mechanical oscillation frequency f and its harmonics. The frequency shift can therefore be altered by varying the mechanical oscillation frequency of elements 12. The distribution of power between the peaks depends on the form and amplitude of the mechanical oscillation. In the illustrated example, shifted peak 25A dominates other peaks 25. When frequency shifting is achieved a significant proportion of the power in reflected beam 20B has a frequency corresponding to a single peak. The fraction of the total power in peaks other than the intended peak is known as the total harmonic distortion (THD).

Figure 7:
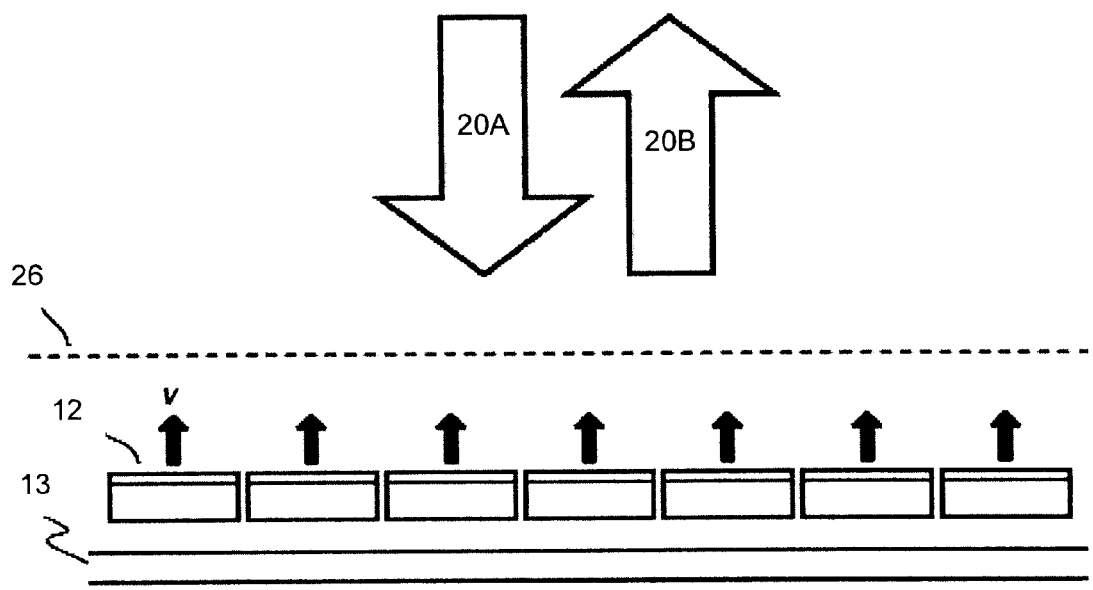
FIGS. 7 and 8 show a modulator having a row of closely-spaced movable elements driven in one group (FIG. 7) and two interleaved groups (FIG. 8).

FIG. 7 illustrates the case where elements 12 are all driven together to have a sawtooth motion. In this case elements rise together with constant velocity u until the reset when they are all moved back to their lowest positions. The elements then rise again at velocity $\upsilon$. Preferably the elements change height during the reset by a distance $\lambda/2$ or a multiple thereof. Light reflected from the moving elements 12 has its frequency shifted by $2\upsilon/\lambda$.

In an electrostatic embodiment elements 12 may be pulled below their equilibrium heights 28 by a driving voltage applied between the elements 12 and substrate 13. The driving voltage is then reduced so to allow elements 12 to rise with constant speed $\upsilon$. Incident beam 20A reflects as beam 20B of increased frequency, due to the Doppler effect. The motion of elements 12 may be reversed (i.e., moving down with constant velocity $\upsilon$ until the reset when they are all moved back to their highest positions) to provide reflected beam 20B with a reduced frequency.

In the embodiment of FIG. 7, elements 12 move in unison. A frequency shift may also be achieved by moving a single larger reflective element in a sawtooth motion. The use of an array of micro-mechanical elements to mimic a larger mirror as illustrated in FIG. 7 has the advantage that each element can have low inertia and therefore a fast response time. The frequency shift can therefore be varied quickly (sub-microsecond time scales are possible). The elements of the array may be fused together without sacrificing this advantage.

In the embodiment illustrated in FIG. 7, the entire optical wavefront experiences the reset (or "retrace") of the sawtooth. The retrace of the sawtooth can cause harmonic distortion. The effect of the retrace of the sawtooth on the reflected light can be ameliorated by staggering the reset among N interleaved element groups according to an N-phase oscillation.

Figure 8:
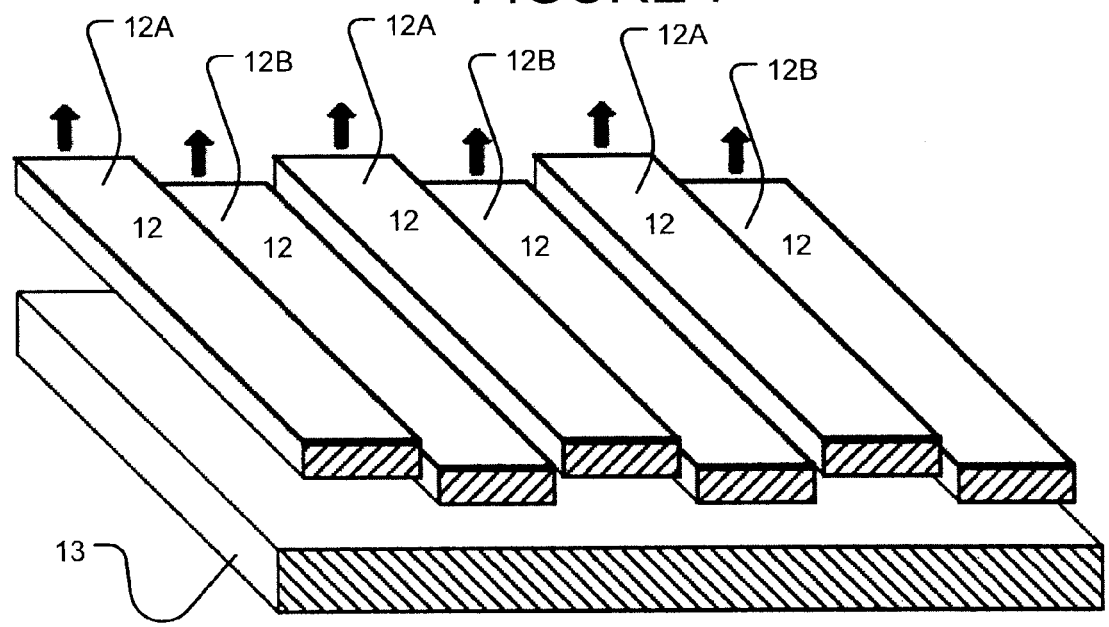
Figure 9:
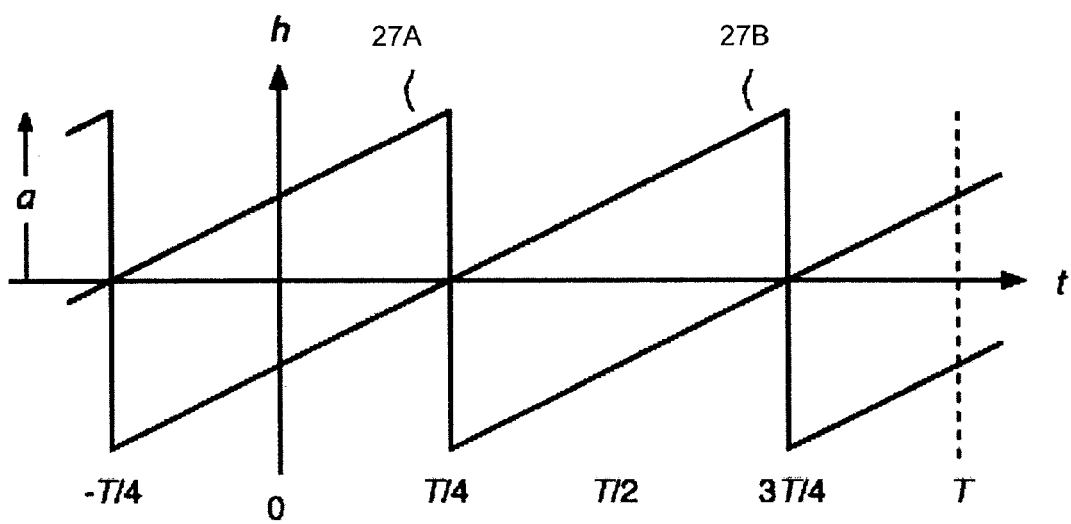
FIG. 9 shows motion profiles according to which elements of the groups of FIG. 8 may be driven.

FIG. 8 is an example for a case where N=2. FIG. 9 shows the oscillation of the elements for the example of FIG. 8. In this example embodiment, only some of the elements (e.g. one half of the elements) are reset at one time. Thus, all other factors being equal, THD can be reduced in comparison to the embodiment of FIG. 7.

FIG. 8 is a schematic perspective view of a modulator having elements 12 moving in a sawtooth wave form as shown in FIG. 9. Elements 12 are divided into two interleaved groups of elements 12A and 12B (N=2). All elements 12 move upward at the same speed except during a retrace (or "reset"). Group 12A follows motion profile 27A and group 12B follows motion profile 27B. At the instant of time captured in FIG. 8, the elements of the first group 12A are about to reach the highest point of their motion, reset to the lowest point, and resume upward motion.

FIG. 9 shows motion profiles 27A and 27B for elements of first group 12A and second group 12B respectively. Each motion profile represents element height h as a function of time t for elements of the corresponding group. The period of the motion is T. At time t=−T/4, the height of the first group is zero. The motion is linear on the range −T/4<t<T/4. In the embodiment illustrated by FIG. 9, the elements of the second group 12B reset one-half period later than the elements of first group 12A. It is preferable but not mandatory that the phase shift between motion profiles 27A and 27B be ½ cycle. Other phase shifts which cause groups 12A and 12B to reset at different times could also be used. However, THD may be larger for other phase shifts.

The case N=2 is particularly useful if the oscillation amplitude is $\alpha=\lambda/2$ and the phase shift between motion profiles 27A and 27B is ½ cycle. In this case the height difference between the elements is $\lambda/2$ and there is no diffraction (apart from parasitic diffraction). The frequency shift $2\upsilon/\lambda$ is equal to twice the mechanical oscillation frequency. Because $\alpha$ is a multiple of $\lambda/4$ the frequency shift is well defined. In this case the 2f peak 25B (see FIG. 6) will dominate. The frequency shifted light is the specular reflection. The overall arrangement may be as shown in FIG. 4.

A modulator controlled as shown in FIG. 8 may be used to switch light by jumping between oscillation amplitudes. For an oscillation amplitude $\alpha=\lambda/2$ the optical power is in the zero order. By switching the amplitude to an amplitude $\alpha=\lambda/4$ the optical power can be switched to the diffracted orders.

Figure 10:
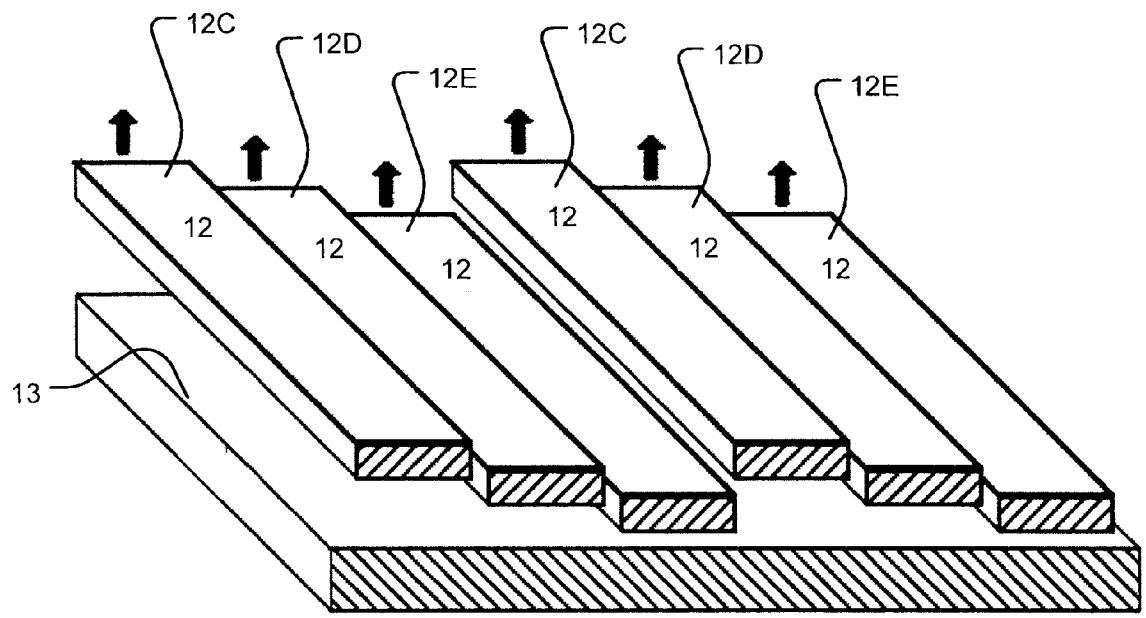
FIG. 10 shows a modulator having a row of closely-spaced movable elements driven in three interleaved groups.
Figure 11:
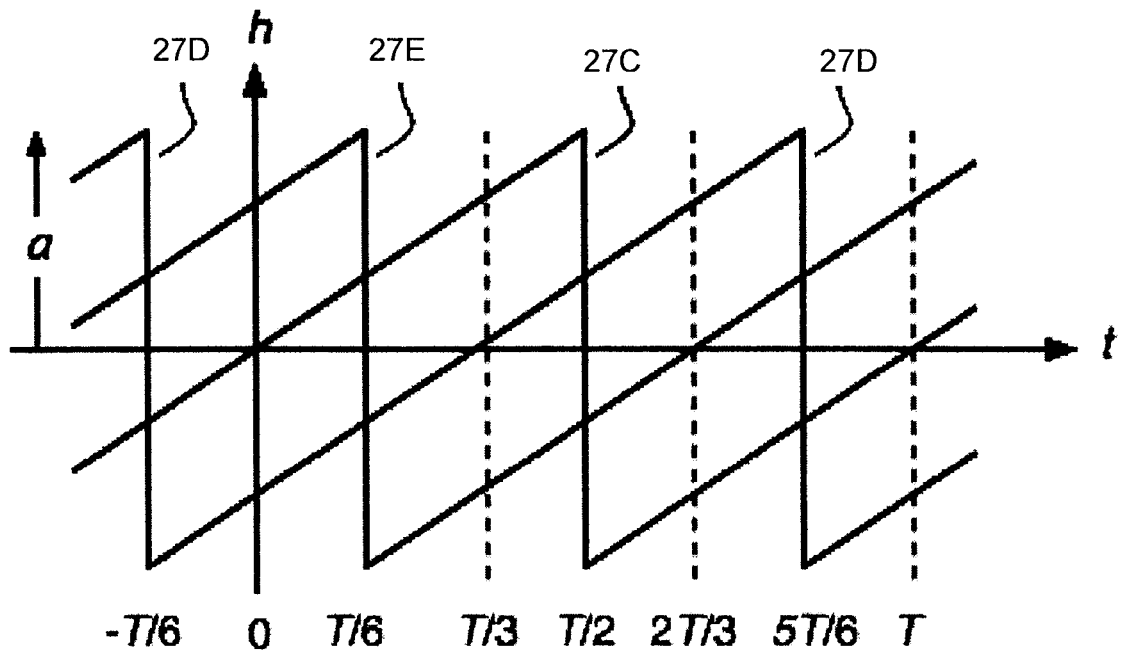
FIG. 11 shows motion profiles according to which elements of the groups of FIG. 10 may be driven.

FIG. 10 is a schematic perspective view of a modulator having elements 12 moving in sawtooth motion profiles 27C, 27D and 27E as shown in FIG. 11. Elements 12 are divided into three interleaved groups of elements 12C, 12D and 12E (N=3). All elements 12 move upward at the same speed except during a retrace (or "reset"). From the instant captured in FIG. 10, elements of the first group 12C are about to reach the highest point of their motion, reset to the lowest point, and resume upward motion.

As shown in FIG. 11, no two of groups 12A, 12B and 12C reset at the same time. In the illustrated embodiment, the elements of a second group 12D reset one-third period later than the elements of first group 12C and the elements of a third group 12E reset one-third period later than the elements of second group 12D. Each motion profile 27C, 27D and 27E shows element height h versus time t respectively for elements of first, second and third groups 12C, 12D and 12E. The period of the motion is T. At time t=0, the height of first group 27C is zero. The motion is linear on the range −T/6<t<T/6.

An advantage of oscillating N>2 interleaved element groups in time according to an N-phase sawtooth waveform is that only a minority of elements is being reset at any one time. This will reduce the THD. To achieve this advantage it is not mandatory that the element groups be consistently interleaved as illustrated in FIG. 10. Members of the element groups could be distributed across the array in some other manner.

For the case of N>2 it can be desirable to interleave the groups of elements regularly such that, when the groups are driven to follow sawtooth motion profiles that are staggered in time, the elements also exhibit a sawtooth profile in space as shown for example in FIG. 10. In this case the element array acts as a diffraction grating. The period of the grating is d=Np, where p is the pitch of the grating.

Figure 12:
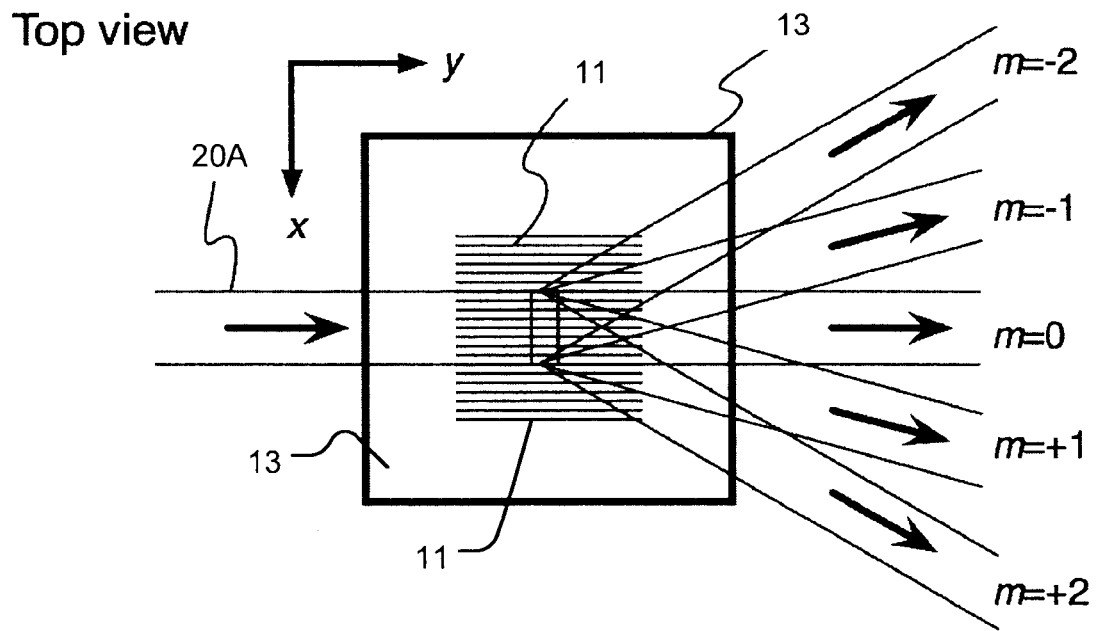
FIG. 12 is a plan view of a modulator like that of FIG. 11 showing diffracted output beams of various diffraction orders.

A system diagram is shown in FIG. 12. To simplify the separation of diffracted from incident light the incident beam may be incident obliquely as show in FIG. 4A. This is not mandatory. For sawtooth motion of the elements with N>2 and $\alpha=\lambda/4$ most optical power is in the m=+1 diffraction order. For N>2 with the groups of elements regularly interleaved, the modulator functions as a blazed grating, which results in a high diffraction efficiency into the m=+1 diffraction order.

Figure 13:
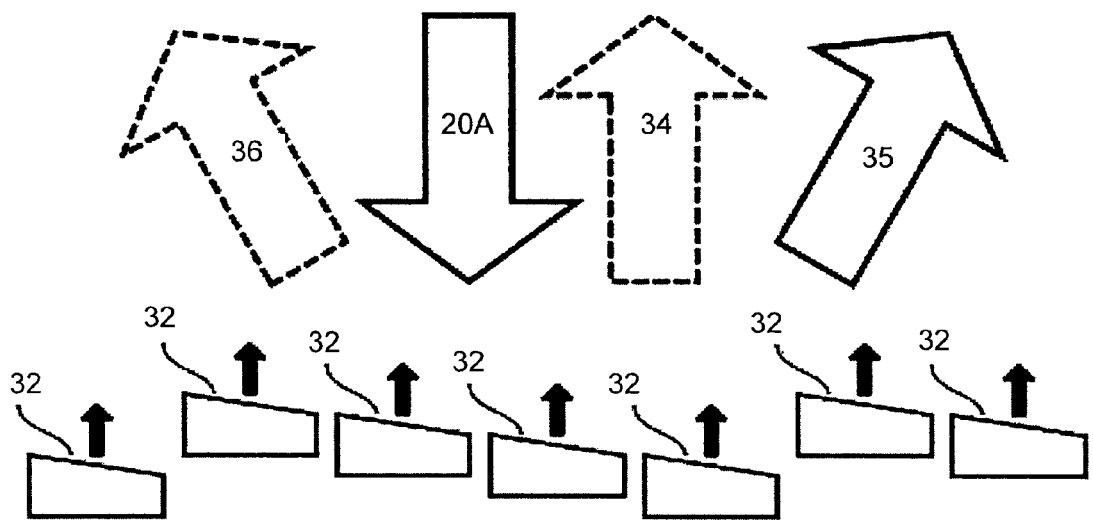
FIG. 13 is a schematic view showing movable elements having blazed reflective surfaces.
Figure 19:
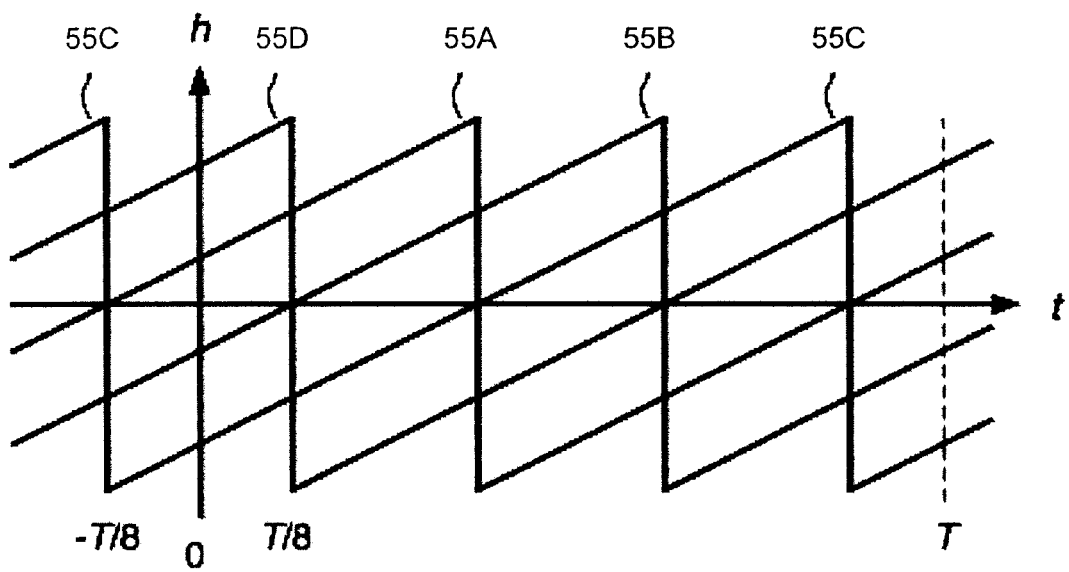
FIG. 19 shows motion profiles according to which elements of the groups of FIG. 18 may be driven.

Further improvement in efficiency is possible by blazing the individual reflective elements 12. This is shown in FIG. 13 for the case N=4. FIG. 13 shows blazed elements 32. Incident beam 20A is specularly reflected by elements 32, and also diffracted into the m=0 order (beam 34), m=+1 order (beam 35) and m=−1 order (beam 36). The blaze of each element 32 is angled in the same direction as the spatial sawtooth pattern formed by elements 32. For maximum efficiency, the blaze angle should be such that the specular reflection from each element 32 is directed in the same direction as the m=+1 diffracted order (beam 35). The angle of the first diffraction order is given by: $\sin^{-1}(\lambda/Nb)$ where b is the spacing of adjacent elements 32. With blazed elements 32 operated as shown in FIG. 13, essentially all reflected power may be in the m=+1 diffracted order. Elements 32 may, for example, be operated to achieve sawtooth motion profiles such as profiles 55A, 55B, 55C and 55D as shown in FIG. 19, in some embodiments.

Figure 14A:
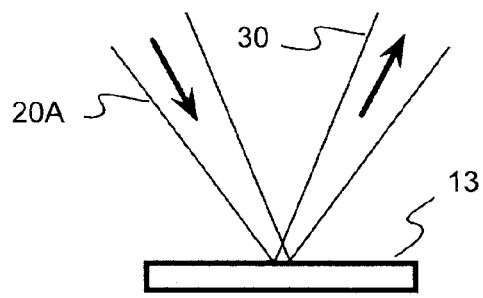
FIGS. 14A and 14B are respectively side and plan views of apparatus for shifting the frequency of incident light according to another embodiment.
Figure 14B:
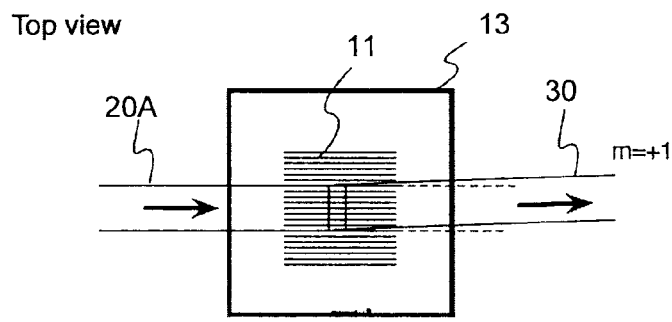

For large N, for example N>5, it is possible to have essentially all optical power in the m=+1 diffracted order without individually blazing the elements, and the modulator can be used as shown in FIGS. 14A and 14B, where beam 30 represents the m=+1 diffracted order.

For an N-phase arrangement it is not necessary to separately control each individual element. The elements may be driven in groups. N voltage sources may be connected to drive the elements via a bus arrangement. The drive voltages are multi-phase signals whose wave form is tailored to obtain motion of the elements approximating an ideal sawtooth. In the alternative, it is also possible to control each element in the array independently and arrange N-phase motion via the controlling circuitry or computer system.

Figure 15:
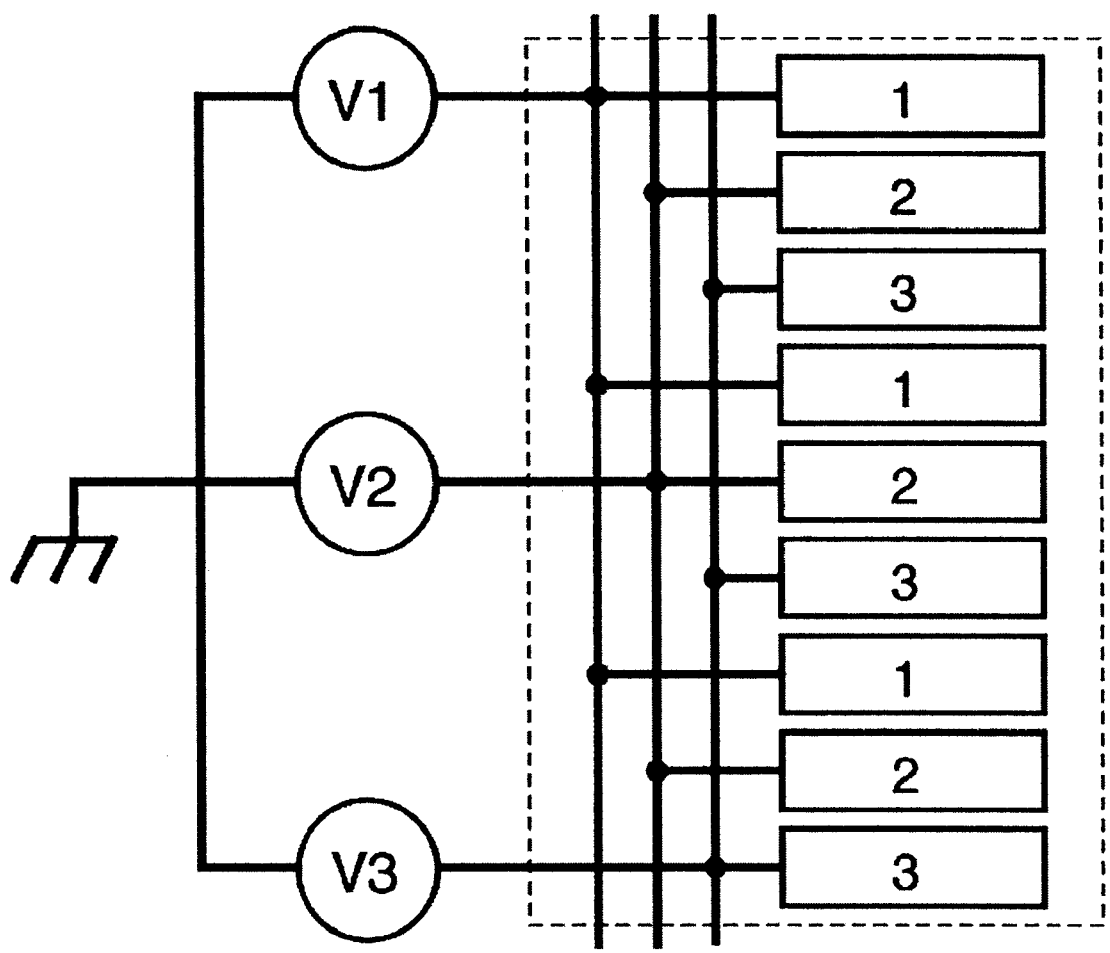
FIG. 15 shows an arrangement of buses for driving elements of a number of different groups of elements to oscillate in unison.

FIG. 15 shows an example bus arrangement for the case N=3. The bus arrangement may be fabricated integrally into a monolith that also provides the elements and substrate. The monolith may comprise extra buses. For example, if the monolith provides 12 buses then the buses may be connected together in different ways to provide suitable connections for the cases where N=1, 2, 3, 4, 6 or 12.

In FIG. 15, signal source V1 controls elements labeled 1, signal source V2 controls elements labeled 2, and signal source V3 controls elements labeled 3. The signal sources provide periodic signals that are time-delayed one source to the next by one-third of the mechanical oscillation period. For electrostatic drive, the signals are voltages and the voltage common is the substrate below the elements.

If the frequency is low enough and the deflections are small enough, then the deflection of the elements will be proportional to the force (quasi-static deflection). Where the force obeys the electrostatic force law ($F \alpha V^2$), to create a deflection that varies linearly in time the voltage should vary as the square root of time. Such a voltage waveform is shown in FIG. 5.

Figure 16:
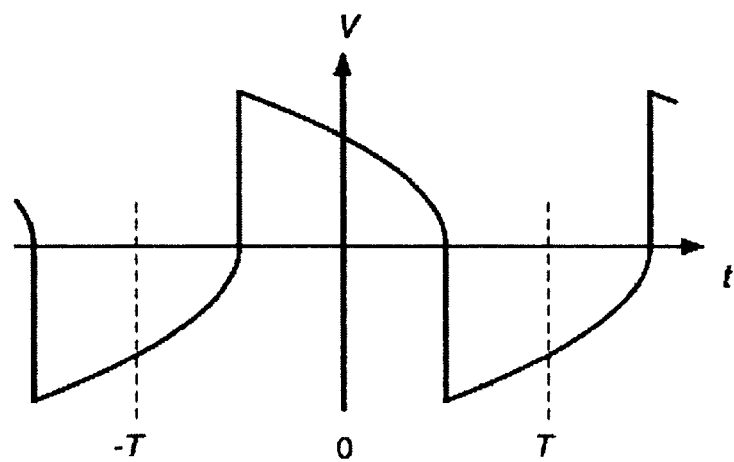
FIG. 16 shows an example of an alternating current driving signal for causing oscillation of an electrostatically-actuated element.

It is known that the use of drive voltages with non-zero time average can lead to problems in MEMS devices due to build-up of electrostatic charges. To avoid charging effects, it is possible to use a purely alternating current (AC) drive voltage to move elements. FIG. 16 is an example of such an AC voltage waveform. The polarity of the voltage reverses every mechanical period T. The period of the voltage waveform is 2T. The voltage in each half-cycle varies as the square root of time.

For higher frequencies, still well below the mechanical resonant frequency of the elements, but at which the deflection is not quasi-static, the voltage wave form may be modified from that shown in FIG. 5 or FIG. 16 to provide motion that is closer to an ideal sawtooth. This involves adjusting the harmonic content of the force to compensate the frequency dependence of the mechanical response. In a practical modulator, the voltage drive may be generated using D/A converters fed by a lookup table programmed to minimize the THD. Measurement of the spectral profile of FIG. 6 (e.g., using a spectrum analyzer) will provide useful feedback to program a lookup table to minimize THD. The presence of mechanical or electrical interaction between the oscillating elements is another distorting factor that can also be compensated for by modification of the voltage wave form used to drive motion of the elements.

The frequency dependence of the mechanical response of the elements will depend on the presence of mechanical damping. In the case of critical damping the "flyback" of the elements is essentially without ringing. The degree of mechanical damping is determined by factors such as the mechanical design of the elements and the ambient atmosphere, if any, in which the elements are operating.

To obtain a reasonable sawtooth waveform, the oscillation frequency should ideally be substantially smaller than the resonant frequency of element motion. A useful guideline is that the frequency of oscillation is preferably less than one-tenth the resonant frequency. For example, if a MEMS element has a resonant frequency is 1 MHz, the frequency of oscillation should preferably be between zero and 100 kHz. This is a useful frequency range for applications such as laser cooling in atomic physics.

Example Embodiments Employing Sinusoidal Motion of Elements

Sinusoidal oscillation of elements is advantageous for operation at high frequency or high bandwidth. When the motion is sinusoidal it is necessary that there be more than two interleaved element groups (N>2) in order for the modulator to produce a frequency shift. In principle oscillation frequencies approaching or even exceeding the mechanical resonant frequency may be employed. A MEMS element may have a resonant frequency higher than 10 MHz, so an embodiment of the invention may readily provide frequency shifts in the MHz range.

The circuitry to generate drive voltages signals for causing sinusoidal motion profiles of elements is simplified because in this case the required voltage wave form is also sinusoidal, even for a square-law force.

For sinusoidal motion the frequency shift of the m=+1 order is the mechanical frequency f, independent of the amplitude of the oscillation. It is not necessary to chose a particular amplitude. This allows the modulator using sinusoidal motion to control both the frequency and the power of the frequency-shifted light. The intensity of the m=+1 order may be varied continuously, without influencing its frequency shift.

There is harmonic distortion of the diffracted light even for perfect sinusoidal motion of the elements. The degree of harmonic distortion is independent of the oscillation amplitude, but becomes lower the larger the number of interleaved groups that are used. A general-purpose modulator using sinusoidal motion of the elements may advantageously have four or more element groups. Three element groups may be acceptable for some applications.

Embodiments of the invention can provide a continuously variable frequency shift without an associated variation of beam direction. This is useful to chirp the frequency of a laser beam, by chirping the frequency of the mechanical oscillation. Chirping the frequency of a laser beam is useful for a range of applications including applications such as laser deceleration of atoms, where chirping the laser beam is used to compensate the varying Doppler-shifted frequency of an atomic transition.

Embodiments of the invention may be used in place of transversely moving gratings employed for frequency shifting, including frequency shifting for purposes of phase shifting.

Figure 17A:
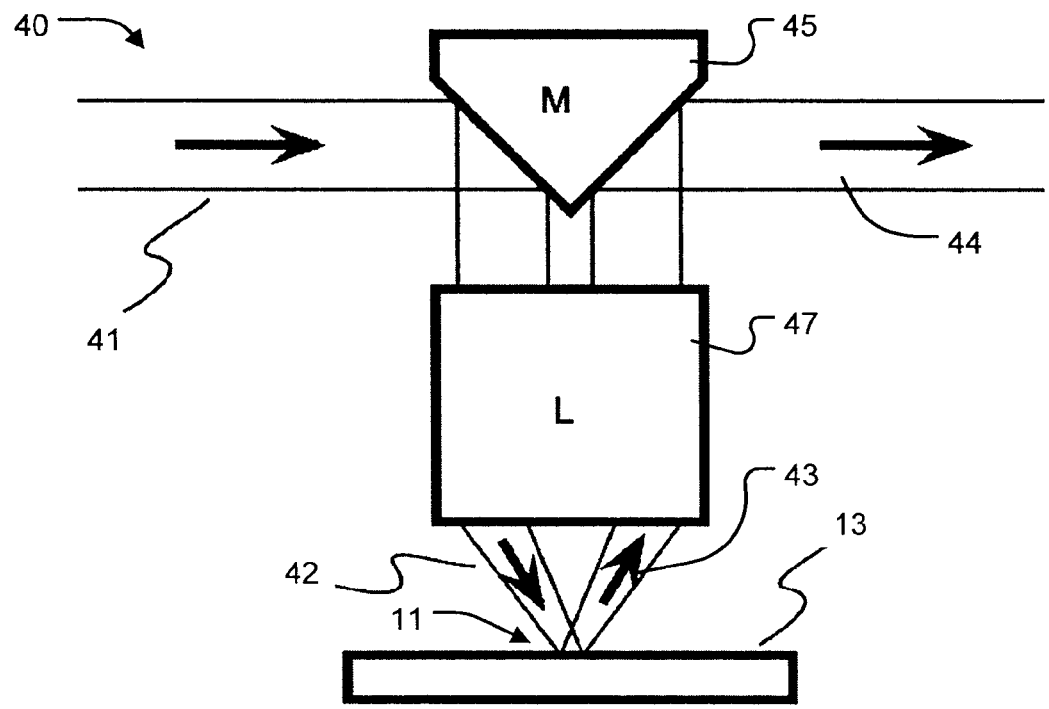
FIGS. 17A and 17B are respectively side and plan views showing apparatus for shifting the frequency of light according to an embodiment where incident and output beams are in at least general alignment.
Figure 17B:
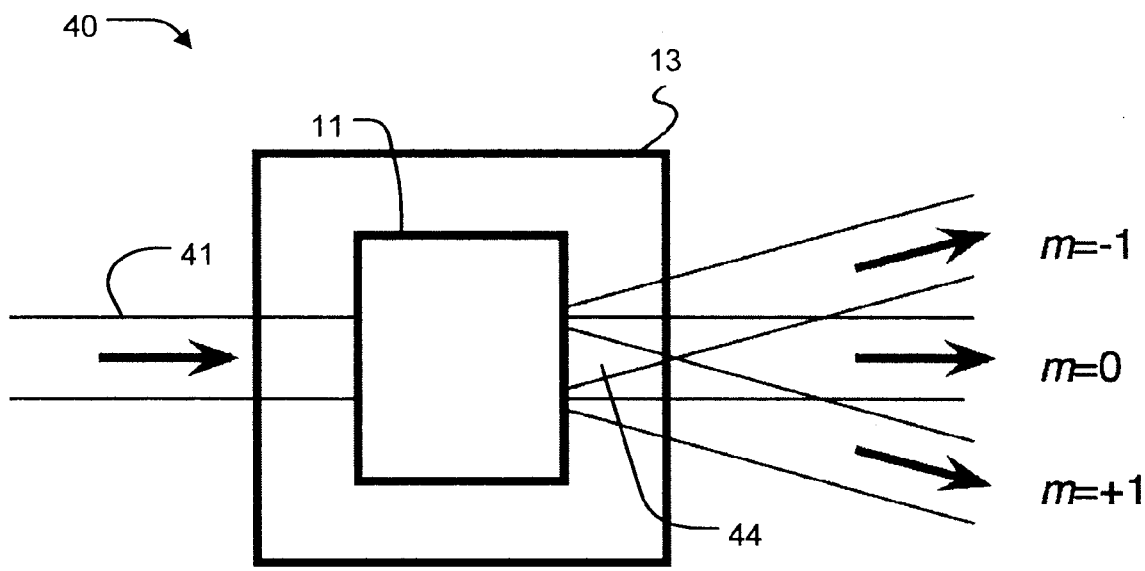

FIGS. 17A and 17B show an apparatus 40 according to a more sophisticated embodiment of the invention. In apparatus 40 an output light beam 44 is propagating in the same direction as an input light beam 41. The direction of output beam 44 is insensitive to slight misalignments of the modulator as a whole. Apparatus 40 may be a drop-in replacement for an acousto-optic modulator in some applications.

Apparatus 40 includes a wedge mirror 45 which diverts light from incoming beam 41 to interact with elements of array 11 before redirecting the light output from array 11 as output beam 44. Depending on the construction and operation of the elements of array 11, diffracted orders may be essential or incidental to the output beam 44.

Optional optical system 47, which may comprise a suitable lens, mirror, or other optical elements focuses light from input beam 41 down to a spot size and shape appropriate to the array 11 of MEMS elements. The optical system may comprise acylindrical elements. Optical system 47 may be omitted if external optics provide an incoming beam having a spot size and shape appropriate to MEMS array 11. As discussed below, light may be carried to and/or from array 11 by an optical fibre or other light guide.

When elements of array 11 have metallic light-reflecting coatings, the efficiency with which light is reflected from the elements can be improved by operating at oblique incidence and increasing the oscillation amplitude correspondingly. The optical phase shift change due to a given motion of the element scales as $\cos \alpha$, where $\alpha$ is the angle of incidence ($\alpha=0$ for normal incidence). This is derived from a path length difference between the increased path length 1/cos α and reduced reference path length tan α sin α.

If the oscillation amplitude α is appropriate to frequency shift light of wavelength λ at normal incidence, then oscillation amplitude α/cos α is appropriate to frequency shift the same light at angle of incidence α (and the frequency shift will be the same).

Operating at oblique incidence can also be used to tune the wavelength of operation. Consider a modulator operating at a fixed amplitude α appropriate to shift the frequency of light of wavelength λ. This modulator will properly frequency shift light of wavelength λ cos α incident at angle α (and the frequency shift will be the original frequency shift multiplied by cos α). For example, a modulator configured for λ=900 nm at normal incidence will be useful for λ=633 nm at α=cos$^{-1}$ (633/900)=45°.

Operation at oblique incidence has the added advantage that it reduces sensitivity to deviations of the elements from flatness, due to the cos α factor in the optical phase shift.

MEMS technology can be compatible with high vacuum. Embodiments of the invention may be applied (at grazing incidence) to shift the energy of ultra-violet or even shorter wavelength electromagnetic radiation. It is possible that embodiments of the invention may be applied to shift the energy of matter waves.

In the following description, for simplicity, reflection losses and gaps between elements are ignored and light is incident normally. Scaling the results to other angles of incidence is relatively straightforward.

Denote the height profile of elements along the surface of an array by h(x, t). When N element groups are used, h(x, t) is periodic in space with period d=Np, where p is the element pitch. Consequently, the modulator can be treated as a time-dependent diffraction grating. The characteristic diffraction angle δ is given by sin δ=λ/d for incident light whose wavelength is λ.

An optical plane wave incident on the modulator will be reflected (ignoring losses) as a wave with a spatially and temporally modulated phase shift given by θ(x,t)=−2 kh(x, t). In this expression, k=2π/λ, is the conventional optical wavevector and h(x, t) is the elevation profile of the reflecting surface.

Due to the periodic spatial variation of the optical phase shift θ(x, t), light will be diffracted into various diffraction orders. For simplicity we take the incident amplitude at the plane z=0 to be unity, corresponding to normal incidence, keeping in mind an implicit $e^{-i\Omega t}$ time dependence with Ω equal to the angular frequency of the incident optical field. The z=0 plane is chosen so that the time-average of h is zero.

The properties of the diffracted beam of m'th diffraction order are found by evaluating the beam amplitude $A_m(t)$, according to diffraction theory given by $$A_m(t) = \frac{1}{d} \int_d dx e^{-im2\pi x/d} e^{i\theta(x,t)} \quad (1)$$

where the integral is over any period of the grating. Considering the case of flat elements the imparted phase shift is constant in space over each element and we can perform the integration in closed form to obtain $$A_m(t) = \frac{1}{N} \text{sinc}\left(\frac{m\pi}{N}\right) \sum_{j=1}^{N} e^{-i2\pi(j-1)m/N} e^{i\theta_j(t)} \quad (2)$$

where index j refers to the element group.

For the case N=2 we have:

$$A_m(t) = \frac{1}{2} \text{sinc}\left(\frac{m\pi}{2}\right)[e^{i\theta_1(t)} + (-1)^m e^{i\theta_2(t)}] \quad (3)$$

From the above expression we obtain the following simple expression for the optical amplitude $A_0(t)$ in the reflected beam (also known as the zero-order diffracted beam):

$$A_0(t) = \frac{1}{3}[e^{i\theta_1(t)} + e^{i\theta_2(t)}] \quad (4)$$

For the case N=3 we have:

$$A_m(t) = \frac{1}{3} \text{sinc}\left(\frac{m\pi}{3}\right)[e^{i\theta_1(t)} + e^{-im2\pi/3} e^{i\theta_2(t)} + e^{-im4\pi/3} e^{i\theta_3(t)}] \quad (5)$$

From the above expression we obtain the following simple expression for the optical amplitude $A_0(t)$ in the reflected beam (also known as the zero-order diffracted beam):

$$A_0(t) = \frac{1}{3}[e^{i\theta_1(t)} + e^{i\theta_2(t)} + e^{i\theta_3(t)}] \quad (6)$$

For determining the result of sawtooth motion as shown, for example, in FIG. 5, we chose the height coordinate h such that −α/2<h<α/2, where α is the amplitude of the height oscillation. For sawtooth motion the optical phase shifts $\theta_i(t)$ are linear functions of time (except for the retrace step). Let α denote the amplitude of the sawtooth motion (half the peak-to-peak amplitude) and T denote the oscillation period. The motion of the elements is from −α to α in time T. The velocity of the elements is therefore υ=2α/T.

The case N=1 corresponds to all elements moving together, as shown in FIG. 7. Time t=0 is chosen to be the time when the elements are at h=0, for the time interval −T/2<t<T/2 we can assume a linear dependence of h on time: h=υt, where υ=2α/T is the speed at which the elements rise. The phase shift of the reflected beam is $\theta_i(t)$=−2 k$h_i$(t) so the amplitude of the reflected beam is given by $$A_0(t) = e^{-i2k\upsilon t}$$

If it were not for the reset of the sawtooth, the frequency shift of the reflected light would be constant. The optical phase jump due to the reset is 4 kα or 8πα/λ. If α=λ/4 (or a multiple thereof) there will be no optical phase jump due to the reset. For α=λ/4 the shift in frequency of the light is the classical value Δf=2υ/λ.

Note that in the case N=1 diffraction does not play a role in the function of the modulator. Most of the optical power is simply reflected and it is this specular reflection that is frequency shifted. Some power will be diffracted into nonzero order due to imperfections in the elements and due to the presence of gaps between the elements. But this will not be critical in typical embodiments. In principle the light may be focused onto a single element that moves according to a sawtooth motion profile to achieve the same result.

The case of N=2 element groups has the advantage that only some of the elements are reset at a time. The elements of the other group continue to provide a frequency shift. This will reduce the harmonic distortion as compared to the case N=1.

The N=2 configuration provides a symmetrical grating, with equal power in the m=+1 and m=−1 orders. Providing efficient output of a frequency-shifted beam presents a challenge if diffracted orders are used since an optical system to recombine the m=+1 and m=−1 orders would be required. Frequency shift is most easily obtained for the m=0 order (specular reflected beam).

FIG. 9 shows how the height of the elements varies in time according to a sawtooth. The height difference between elements is $\alpha$. Choosing t=0 to be the time when element 1 is at h=$\alpha$/2, for the time interval $-T/4 < t < T/4$ we can take $$h_1(t) = vt + \alpha/2$$

$$h_2(t) = vt - \alpha/2 \tag{7}$$

Using (3) and $\theta_i(t) = -2 k h_i(t)$ we find that the amplitude of the zero-order diffracted beam is given by:

$$A_0(t) = \frac{1}{2} e^{-i2kvt}(e^{-ika} + e^{ika}) = e^{-i2kvt} \cos ka \tag{8}$$

and the amplitude of the m=±1 diffracted beams is given by $$A_{\pm 1}(t) = \frac{1}{\pi} e^{-i2kvt}(e^{-ika} - e^{ika}) = -\frac{2i}{\pi} e^{-i2kvt} \sin ka \tag{9}$$

Recall that the frequency shift spectrum of the reflected light consists of peaks at harmonics of the mechanical oscillation frequency f. This is not inconsistent with the above expressions that show a constant frequency shift of the classical value $2v/\lambda$, because we have yet to take into account the discontinuity of the sawtooth reset.

To calculate the phase shift induced by the reset of the sawtooth we continue the analysis into the time following the reset. At time t=T/4, element 1 reaches h=$\alpha$ and resets to h=−$\alpha$. For the subsequent time interval $T/4 < t < 3T/4$ we have $$h_1(t) = vt - 3\alpha/2$$

$$h_2(t) = vt - \alpha/2$$

Again using (3) we find that during this time interval the amplitude of the zero-order diffracted beam is given by:

$$A_0(t) = \frac{1}{2} e^{-i2kvt}(e^{i3ka} + e^{ika}) = e^{-i2kvt} e^{i2ka} \cos ka \tag{11}$$

and the amplitude of the m=±1 diffracted beams is given by:

$$A_{\pm 1}(t) = \frac{1}{2} e^{-i2kvt}(e^{i3ka} - e^{ika}) = \frac{2i}{\pi} e^{-i2kvt} e^{i2ka} \sin ka \tag{12}$$

Comparing the expressions for $A_{\pm 1}$ in the two time intervals considered, for example (9) and (12), reveals that there is no optical phase change if $4 k\alpha$ is a multiple of $2\pi$; this condition requires $\alpha$ to be a multiple of $\lambda/4$. We conclude that the reset has no effect on the optical phase when $\alpha = \lambda/4$, in which case the classical Doppler shift is equal to the mechanical oscillation frequency.

For an oscillation amplitude $\alpha = \lambda/4$ the intensity in the m=±1 orders is maximized: no energy remains in the m=0 order, 41% of the energy appears in the m=+1 order, 41% of the energy appears in the m=−1 order, and, because we have neglected losses in this calculation, the remainder of the energy appears in higher orders.

An advantageous mode of operation of the N=2 modulator uses $\alpha = \lambda/2$. In this case there is no diffraction: all of the optical power is in the zero order. But there is a frequency shift, given by the phase factor in (8). The frequency shift is equal to twice the mechanical oscillation frequency.

In the case N=3 the height difference between elements is $2\alpha/3$. Choosing t=0 to be the time when element 1 is at h=0, for the time interval $-T/6 < t < T/6$ we can take:

$$h_1(t) = vt$$

$$h_2(t) = vt - 2\alpha/3$$

$$h_3(t) = vt + 2\alpha/3 \tag{13}$$

to describe a profile that is moving to the right as the elements rise. The motion of the elements is shown in FIG. 12.

Using (5) and $\theta_i(t) = -2 k h_i(t)$ we find the following amplitudes. The amplitude of the zero-order diffracted beam is given by:

$$A_0(t) = \frac{e^{-i2kvt}}{3}\left[1 + 2\cos\frac{4ka}{3}\right] \tag{14}$$

The amplitude of the m=−1 diffracted beam is given by:

$$A_{-1}(t) = \frac{\sqrt{3}}{2\pi} e^{-i2kvt}[1 + e^{i2\pi/3} e^{i4ka/3} + e^{i4\pi/3} e^{-i4ka/3}] \tag{15}$$

The amplitude of the m=+1 diffracted beam is given by:

$$A_1(t) = \frac{\sqrt{3}}{2\pi} e^{-i2kvt}[1 + e^{-i2\pi/3} e^{i4ka/3} + e^{-i4\pi/3} e^{-i4ka/3}] \tag{16}$$

Recall that the frequency shift spectrum of the reflected light consists of peaks at harmonics of the mechanical oscillation frequency f. This is not inconsistent with the above expressions that show a constant frequency shift of the classical value $2v/\lambda$ because we have yet to take into account the discontinuity of the sawtooth reset. Before we do so, however, it is worth pointing out that $A_o = 0$ for $\alpha = \lambda/4$, for $\alpha = \lambda/2$, but not for $\alpha = 3\lambda/4$. For $\alpha = 3\lambda/4$, the height difference between the elements is λ/2 and there is no diffraction. There is, however, a frequency shift. This is the N=3 analog of the efficient mode of operation found for N=2.

Now we calculate the phase shift induced by the reset of the sawtooth. At time t=T/6, element 3 reaches h=α and resets to h=−α. For the subsequent time interval T/6<t<T/2 (see FIG. 12) we have:

$$h_1(t) = vt$$

$$h_2(t) = vt - 2\alpha/3$$

$$h_3(t) = vt - 4\alpha/3 \tag{17}$$

During this time interval the amplitude of the m=+1 diffracted beam is given by:

$$A_1(t) = \frac{\sqrt{3}}{2\pi} e^{-i2kvt}[1 + e^{-i2\pi/3}e^{i4ka/3} + e^{-i4\pi/3}e^{-i8ka/3}] \tag{18}$$

Comparing the expressions for $A_1$ in the two time intervals considered reveals that the only change is a phase shift of 4 kα the last term and that there is no optical phase change if α is a multiple of λ/4. If we chose the oscillation amplitude to be α=λ/4 then $A_o = A_{-1} = 0$ and for all time we have:

$$A_1(t) = \frac{3\sqrt{3}}{2\pi} e^{-i\omega t} \tag{19}$$

where ω=2πf. In this case all of the power is in the fundamental peak 25A in FIG. 6.

The squared magnitude of $A_1$ is constant in time and corresponds to 68% of the incident light being diffracted into the m=+1 order; the remainder of the power will be in higher orders. In our analysis we did not consider losses due to imperfect reflectivity and the gaps between the elements.

Figure 18:
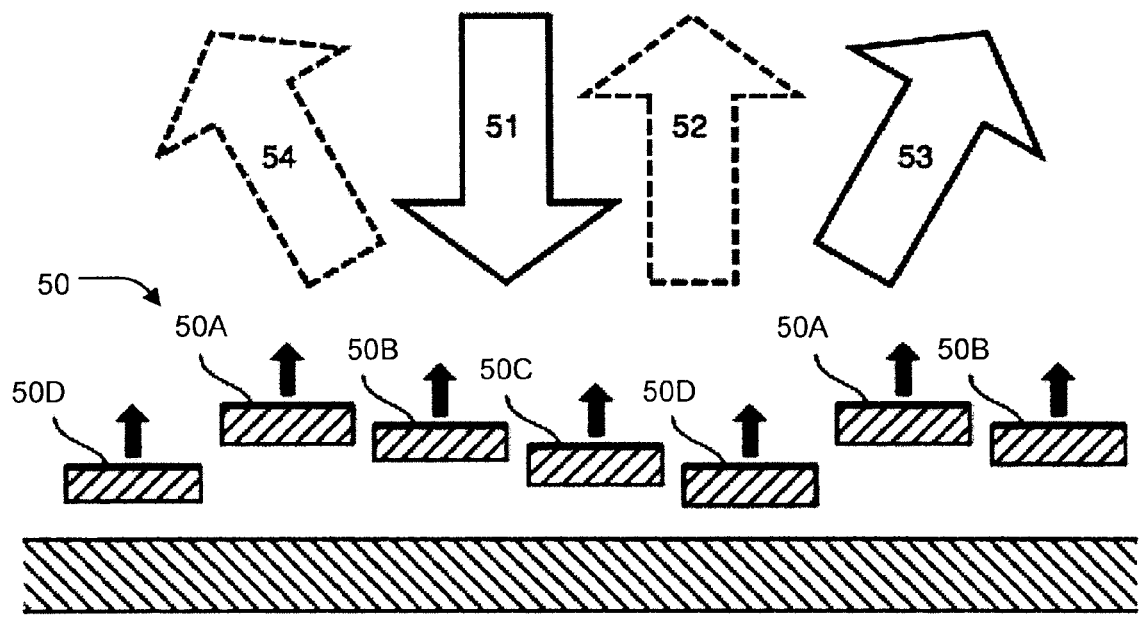
FIG. 18 shows a modulator having a row of closely-spaced movable elements driven in four interleaved groups.

One way to obtain higher power in the m=+1 order is to use a larger value of N. Refer to FIG. 18 for diffraction scenario and to FIG. 19 for h(t) curves for the case N=4. FIG. 18 is a schematic side view of a modulator having elements 50 moving in sawtooth motion profiles 55A, 55B, 55C and 55D as shown in FIG. 19. Elements 50 are divided into four interleaved groups of elements 50A, 50B, 50C and 50D. In FIG. 18, all elements 50 are moving upward at a common speed 1). Elements 50 of a first group 50A are about to reset (return to lowest position). FIG. 18 shows an input beam 51, a zero-order diffracted beam 52, an m=+1 diffracted beam 53 and a m=−1 diffracted beam 54. FIG. 19 shows sawtooth motion profiles in which profiles 55A through 55D respectively represent the height of elements of groups 50A through 50D. The period of the motion is T.

As shown in FIG. 18, the elements form a staircase. Incident beam of light 51 is diffracted to form a m=+1 beam of light 53. The m=−1 diffracted beam 54 is absent or very weak. For correct choice of oscillation amplitude the m=0 beam 52 is also absent. Because the element groups are moving upward, the optical frequency of beam 53 is Doppler shifted to a higher optical frequency. The oscillation of the element groups can be reversed to shift beam 52 to a lower frequency.

In the case N=4 the height difference between elements is α/2. Choose t=0 to be the time when element 1 is at h=α/4. For the time interval −T/8<t<T/8 we can take:

$$h_1(t) = vt + \alpha/4$$

$$h_2(t) = vt - \alpha/4$$

$$h_3(t) = vt - 3\alpha/4$$

$$h_4(t) = vt + 3\alpha/4 \tag{20}$$

to describe a profile that is moving to the right as the elements rise. Using (2) and $\theta_i(t) = -2\,kh_i(t)$ we find the following amplitudes. The amplitude of the zero-order diffracted beam is given by:

$$A_0(t) = \frac{e^{-i2kvt}}{2}\left[\cos\frac{ka}{2} + \cos\frac{3ka}{2}\right]$$

The amplitude of the m=+1 diffracted beam is given by:

$$A_1(t) = \frac{1-i}{\pi\sqrt{2}} e^{-i2kvt}\left[\cos\frac{ka}{2} + \sin\frac{ka}{2} - \cos\frac{3ka}{2} + \sin\frac{3ka}{2}\right]$$

The amplitude of the m=−1 diffracted beam is given by:

$$A_{-1}(t) = \frac{1-i}{\pi\sqrt{2}} e^{-i2kvt}\left[\cos\frac{ka}{2} - \sin\frac{ka}{2} - \cos\frac{3ka}{2} - \sin\frac{3ka}{2}\right]$$

Choosing the oscillation amplitude to be α=λ/4 then $A_o = A_{-1} = 0$ and $$A_1(t) = \frac{2(1-i)}{\pi} e^{-i2kvt}$$

From this amplitude it is straightforward to calculate that the power in the m=+1 order is constant and equal to $8/\pi^2$, or 81%.

As the number N of element groups is increased, the fraction of light transferred into the m=+1 order increases. In general the fraction is $[\sin c(\pi/N)]^2$ giving 81% at N=4, 88% at N=5, etc. Therefore for large N we may neglect all but the m=+1 order and consider the modulator as a Doppler mirror, as shown in FIG. 14. This is similar to the N=1 case except that the effect of the sawtooth reset is localized in space and hence less pronounced in its effect on the m=+1 order.

Figure 20:
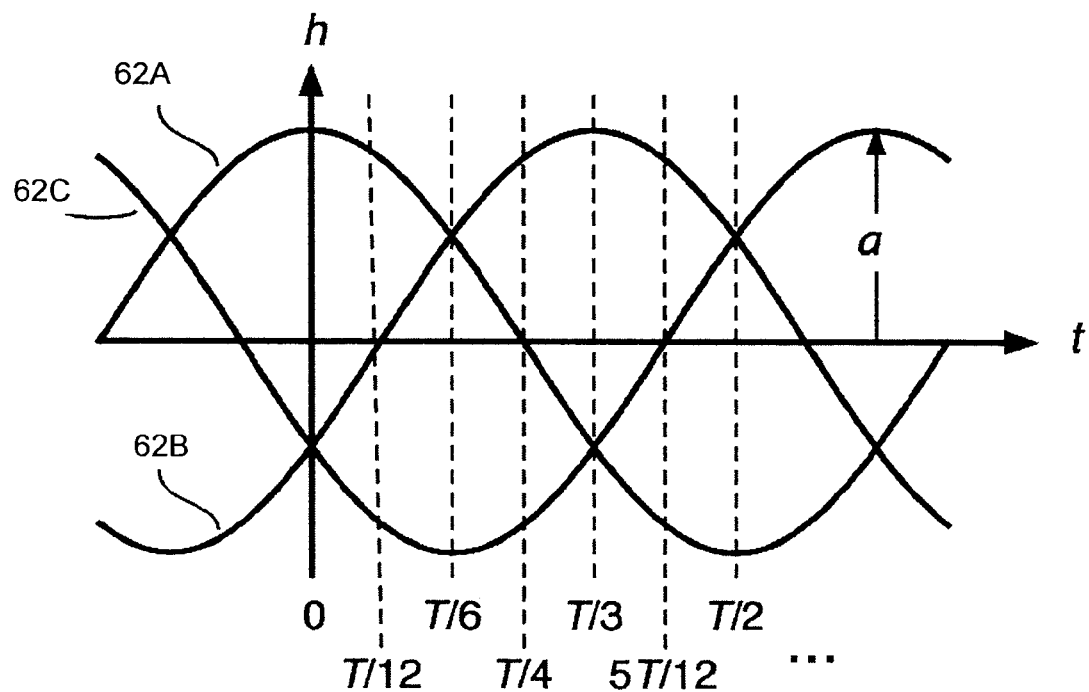
FIG. 20 shows sinusoidal motion profiles for driving three interleaved groups of elements.

FIG. 20 shows sinusoidal motion profiles 62A, 62B and 62C for the case N=3 (three interleaved groups of elements such as groups 12C, 12D and 12E of FIG. 10, for example). The period of the motion is T. The amplitude of the motion is α.

At the initial time (t=0) first group corresponding to profile 62A is at the apex of its trajectory and the height of the elements of the groups corresponding to profiles 62B and 62C are equal; however the group corresponding to profile 62B is moving upward and the group corresponding to profile 62C is moving downward. At the end of one-third period (t=T/3) the group corresponding to profile 62B has reached the apex of its trajectory. Every one-third period the evolution is similar to the preceding third period, only the pattern is shifted by one element. In the second third period the apex of the surface profile will move from the group of motion profile 62B to the group of motion profile 62C. In the final third period the apex will move from the group of motion profile 62C to the group of motion profile 62A.

The optical phase shift $\theta_i(t)$ of the light reflect from an element of group i is given by the oscillatory function of time $\theta_i(t)=u \sin \phi_i(t)$. Here u is the amplitude of the phase shift oscillation, given by $u=-2 k\alpha$ where $\alpha$ is amplitude of the mechanical oscillation. The phases $\phi_i(t)$ of the mechanical oscillation for the N element groups are linear functions of time corresponding to N-phase sinusoidal motion.

The phases $\phi_i(t)$ of the mechanical oscillation for the three element groups 62A, 2, and 3 are linear functions of time given by $$\phi_1(t)=-\omega t$$

$$\phi_2(t)=-\omega t+2\pi/3$$

$$\phi_3(t)=-\omega t+4\pi/3 \quad (21)$$

where $\omega=2\pi f$ is the angular frequency of mechanical oscillation. Because the individual optical phases $\theta_i(t)$ are sinusoidal functions of time, the amplitude of the zero-order beam, given by (6), is a complicated nonlinear function. It can be expanded as a sum of harmonics using the relation $$e^{iu\sin\varphi} = \sum_{n=-\infty}^{\infty} e^{in\varphi} J_n(u) \quad (22)$$

where $J_n(u)$ is a Bessel function of the first kind. Using (22) the amplitude of the zero-order beam is given by the sum:

$$A_0(t) = \frac{1}{3}\sum_{n=-\infty}^{\infty} [e^{in\varphi_1(t)} + e^{in\varphi_2(t)} + e^{in\varphi_3(t)}] J_n(u) \quad (23)$$

In this expression the arguments of the exponentials are linear in time. In practice the most significant terms in the sum are those with low values of |n|. To a first approximation the reflected power is minimized when the n=0 term is zero. This occurs when the phase modulation amplitude $\upsilon$ is equal to $j_{0,1}=2.40482$ (the first zero of $J_0$). A more accurate picture is obtained by considering all terms in the sum (23). Because of the phase relations (21) the only terms that are not zero are those with n divisible by three. Sum (23) has non-zero terms and the zero-order diffracted (i.e., undiffracted) beam can not be perfectly attenuated.

It can be shown that the time-average power in the zero-order beam is:

$$\langle P_0 \rangle = \sum_{n=-\infty}^{\infty} J_{3n}^2(u) \quad (27)$$

Figure 21:
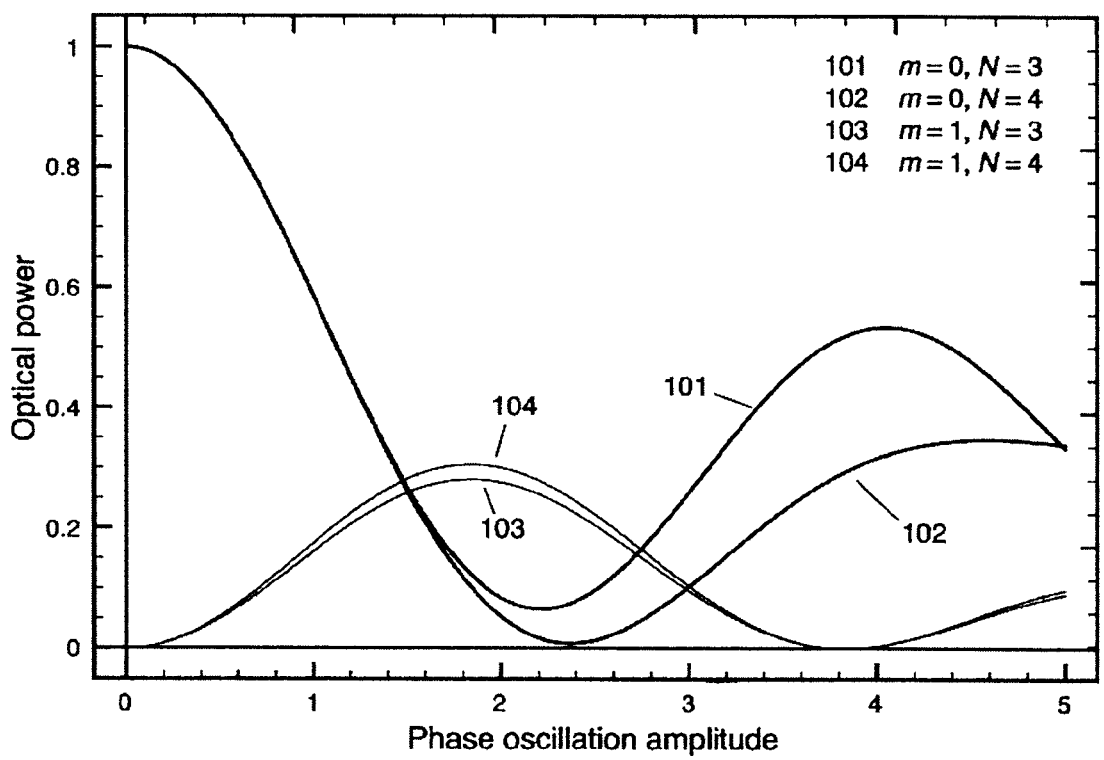
FIG. 21 shows optical power output into zero$^{th}$ and first diffraction orders for elements moved according to sinusoidal motion profiles for three-phase and four-phase cases.

Only Bessel functions of order divisible by three appear. FIG. 21 shows the time-average intensity of the zero-order beam (specular reflectivity) as a function of the phase modulation amplitude u. Curves 101 (m=0) and 103 (m=+1) correspond to three element groups (N=3). By operating near u=2.2 the reflected intensity is 6.5%. This corresponds to a contrast ratio in the zero-order beam of 15:1 between quiescent and operating states.

For operation near z=2.2, the leading terms for the m=+1 diffracted beam are:

$$A_1(t) \cong \frac{3\sqrt{3}}{2\pi}[J_1(u)e^{-i\omega t} + J_{-2}(u)e^{2i\omega t} + \ldots] \quad (29)$$

Remembering the implicit time dependence $e^{-i\Omega t}$ of the amplitude of the incident beam, we see that the leading term of the m=+1 diffracted order has time dependence $e^{-i(\Omega+\omega)t}$ and therefore describes a beam with its optical frequency increased from that of the incident beam by an amount equal to the mechanical frequency f. A similar calculation shows that the m=-1 diffracted order has its optical frequency decreased by an amount equal to the mechanical frequency. Because the orders may be separated on the basis of their direction, a frequency shift is achieved.

The frequency shifting effect of N>2 interleaved groups of elements driven in a properly phased manner can be contrasted to absence of frequency shifting in switched gratings, where only two interdigitated groups of elements are used. However, in the case of N=3 there is significant harmonic distortion which may not be acceptable in some applications. The harmonic distortion is significant because $J_1(u)$ is not much larger than $J_{-2}(u)$ at $\upsilon=2.2$. Numerically we have $J_1(2.2)=0.556$ and $J_{-2}(2.2)=0.395$, which means there is half as much power in the second harmonic as in the first harmonic. Furthermore, the total power at the fundamental frequency is only 21%.

For the case of sinusoidal motion with N=4 (four element groups) it can be shown that the amplitude of the m'th diffraction order is given by:

$$A_m(t) = \text{sinc}\left(\frac{m\pi}{4}\right)\sum_{n=-\infty}^{\infty} J_{4n+m}(u)e^{-i(4n+m)\omega t} \quad (31)$$

and time-average power in the m'th diffraction order is given by:

$$P_m(t) = \left[\text{sinc}\left(\frac{m\pi}{4}\right)\right]^2 \sum_{n=-\infty}^{\infty} J_{4n+m}^2(u) \quad (32)$$

FIG. 21 shows the time-average power in m=0 beam (curve 102) and m=±1 beams (curve 104) as a function of the phase modulation amplitude $\upsilon$. The reflected (m=0) power is minimized at z=2.4, where it is 0.8%. This very low value indicates the quality of the approximation of the surface profile to a sinusoid. For the m=+1 diffraction order the leading terms are:

$$A_1(t) \cong \frac{2\sqrt{2}}{\pi}[J_1(u)e^{-i\omega t} + J_{-3}(u)e^{3i\omega t} + \ldots] \quad (33)$$

where $J_1(2.4)=0.520$ and $J_{-3}(2.4)=-0.198$; the third harmonic content is $(0.198/0.520)^2$ or below 15%. Higher terms in the above series are significantly smaller, so this can be used as a good estimate of the THD. The power in the m=+1 order at the fundamental frequency is 22%, close to the maximum possible for a sinusoidal grating (27%).

The foregoing analysis may be generalized to any number of groups of elements. Increasing the number of groups improves the harmonic purity of the first diffracted orders. For arbitrary N the THD of the m=+1 beam may be calculated as follows:

$$THD = \frac{1}{J_1^2(u)} \left[ \sum_{n=-\infty}^{\infty} J_{Nn+1}^2(u) \right] - 1 \qquad (34)$$

Increasing the number of groups reduces the diffraction angle possible for a given element width and hence reduces the separation of the diffraction orders. If the m=+1 and m=−1 orders can not be completely separated, their frequency shifts may be impossible to exploit (in some applications overlap of positive and negative frequency shifted light is acceptable, but in such cases pure amplitude modulation will suffice).

The minimum element width is dictated by the cost or even possibility of manufacture; this will put limits on the number of groups advisable in any given application. Reduction of element width will also reduce efficiency, as the gap between elements will typically become a larger fraction of the element width.

Example Embodiment

In some embodiments, elements comprise reflective tensioned ribbons as described in U.S. Pat. No. 5,311,360 which is hereby incorporated herein by reference. Such elements can be made to have high resonant frequencies. This facilitates allowing the modulator to provide a large frequency shift and good bandwidth. Furthermore, the damping of the motion can be chosen by design to correspond to an oscillator that is under-damped, critically damped, or over-damped as described in Payne et al. *Enabling high data-rate imaging applications with grating light valve technology* in Haken Urey and David L. Dickensheets editors *MOEMS Display and Imaging Systems II*, vol. 4348 of *Proceedings of the SPIE* pp. 76-88, 2004 which is hereby incorporated herein by reference.

Tensioned ribbons may be made of $Si_3N_4$ and $SiO_2$ films and formed by a lithographic process. The surface of the ribbon is typically coated with a metallic film to make the ribbon reflective to light. The ribbons are typically 200-300 nm in thickness, 100-1000 μm in length, and 1-10 μm wide. The gap between the ribbons can be less than 1 μm. The ribbons are under high tension (the stress is about 800 MPa) which gives their oscillation a high resonant frequency. For ribbon lengths below 24 μm, the resonant frequency can be in excess of 10 MHz.

The ribbons may be deflected by applying a voltage to the ribbons relative to the substrate below the ribbons, which results in an electrostatic force that attracts the ribbons toward the substrate. The ribbons can be deflected by λ/4 (the deflection required for strong diffraction from a square-well grating) with the application of a constant voltage below 10 V. The mechanical response to a voltage step can be faster than 100 ns.

The ribbons are held by their ends and therefore should be illuminated near their middle sections where the maximum deflection occurs. An optical arrangement such as, for example, that shown in FIG. 17 is desirable into order to focus the incident light beam onto the ribbon elements.

The period of the grating is the element pitch multiplied by the number of element groups. For a element pitch of 10 μm and four element groups, the period of the grating is d=40 μm. This is small enough to provide a useful diffraction angle for visible light. The sine of the diffraction angle is the ratio of the wavelength of light to the period of the grating, so for a visible wavelength of 0.55 μm the angle is 14 mrad.

The speed of the elements is 2 αf, where α is the amplitude of the motion. For f=10 MHz and α=200 nm, the element velocity is 2 m/s.

In some embodiments, the light in incident beam 20A is pulsed. In such embodiments, it can be advantageous to coordinate the pulsing of incident beam 20A with the oscillations of elements 12. For example, the onset of pulses of incident light 20A may be timed to coincide with the same part of the waveform of the motion profiles of elements 12. Where elements 12 are moved according to a motion profile having a sawtooth waveform, pulses may be timed so as to avoid the reset portions of the sawtooth waveform. Where the pulses avoid the reset portions of the waveform, there is no requirement on size of retrace. In such embodiments the sawtooth waveform may have any suitable amplitude. Where elements 12 are moved according to a motion profile having another waveform, such as a sinusoidal waveform wherein the speed of motion of elements 12 is different at different parts of the waveform, the onset of pulses of incident light 20A should be timed to coincide with the same part of the waveforms of the motion profiles of elements 12.

Figures 22A, 22B:
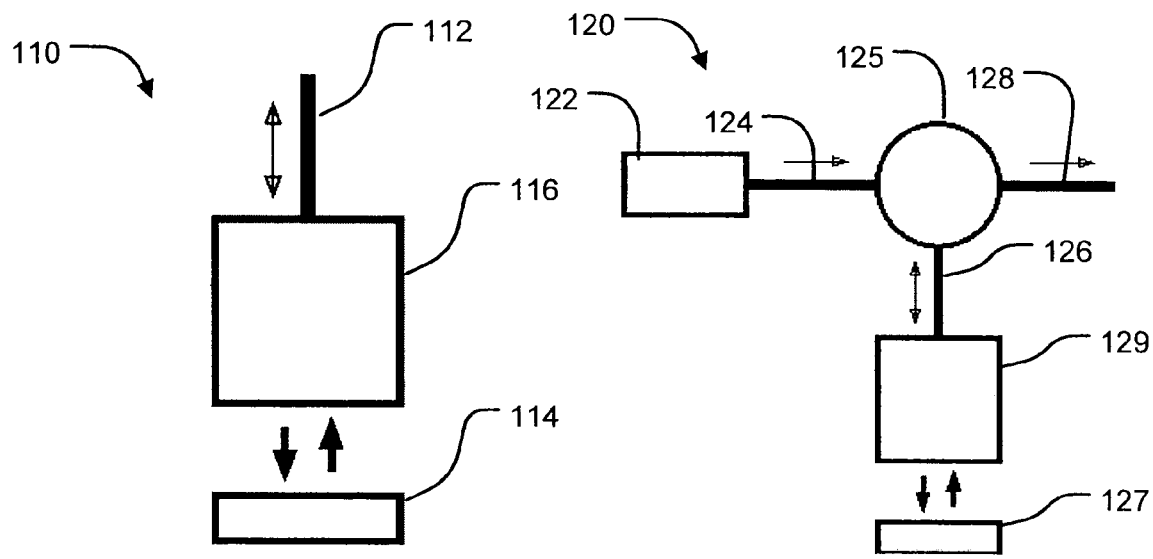
FIGS. 22A, 22B and 22C illustrate example embodiments wherein light is carried to and/or from a frequency-shifting or phase-shifting modulator by one or more optical fibres.
Figure 22C:
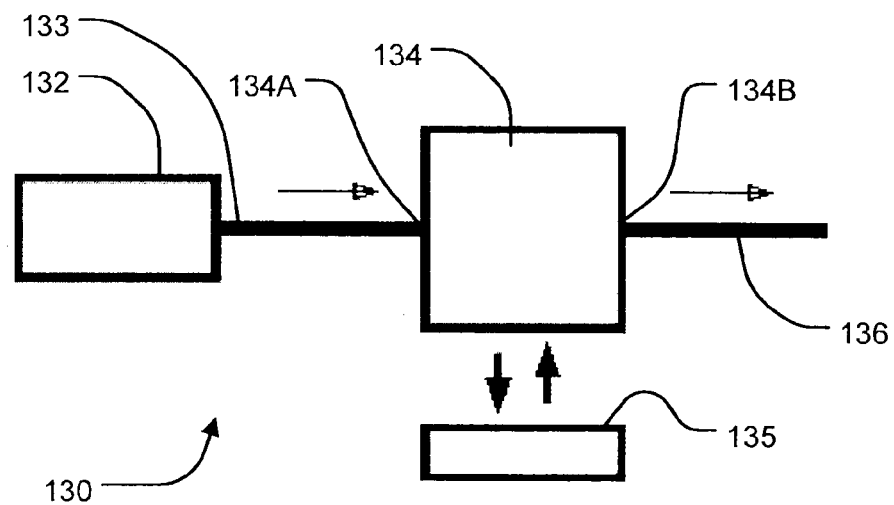

In some embodiments, light is carried to or from a frequency-shifting and/or phase-shifting modulator as described herein by an optical fibre or other light guide. FIGS. 22A, 22B and 22C show example embodiments. FIG. 22A shows an apparatus 110 in which light is carried by an optical fiber 112 to and from a modulator 114. Coupling optics 116 direct incident light from fibre 112 onto modulator 114 and couple light that has interacted with modulator 114 (and thereby undergone a change in frequency and/or phase) back into fibre 112.

FIG. 22B shows apparatus 120 having a light source 122 which emits light into an optical fibre 124. Light source 122 comprises a laser, for example a laser diode or other solid-state laser, in some embodiments. Light passes through fibre 124 to a circulator or directional coupler 125. Directional coupler 125 directs light incident from fibre 124 into a fibre 126 which carries the light to a modulator 127. Light that has interacted with modulator 127 is coupled back into optical fibre 126. At directional coupler 125 the light incident in optical fibre 126 is directed onto optical fibre 128. Coupling optics 129 direct incident light from fibre 126 onto modulator 127 and couple light that has interacted with modulator 127 (and thereby undergone a change in frequency and/or phase) back into fibre 126.

FIG. 22C shows apparatus 130 comprising a light source 132 that emits light into an optical fibre 133. Coupling optics 134 direct incident light received at port 134A from fibre 133 onto modulator 135 and couple light that has interacted with modulator 135 (and thereby undergone a change in frequency and/or phase) into fibre 136 by way of a second port 134B. Light exiting coupling optics 134 at second port 134B is carried on optical fibre 136 to a desired destination.

The invention may be embodied in a wide variety of ways including:
- Modulators for use in shifting the frequency and/or phase of incident light.
- Variable-frequency light sources comprising a light generator, such as a laser, which may comprise a solid state laser such as a laser diode or the like arranged to illuminate a modulator as described herein. The light source may comprise a suitable optical system for directing incident light from the light generator onto an active area of the modulator.
- Methods for shifting the frequency of light and/or shifting the phase of light.

Embodiments of the invention may be made to have certain advantages for certain applications. These include:
- An embodiment may provide a modulator that will function as a high-bandwidth Doppler mirror.
- An embodiment may provide a deformable grating modulator that will shift the frequency of diffracted light.
- An embodiment may provide a modulator that can vary the frequency of the frequency-shifted light without substantially changing its direction or intensity.
- An embodiment may provide a modulator that can vary the intensity of the frequency shifted light without substantially changing its direction or frequency.
- An embodiment may provide a modulator that suitable for integration into micro-electro-mechanical systems (MEMS) or micro-optical-electro-mechanical systems (MOEMS).
- An embodiment may provide a modulator to shift the frequency of light requiring only a low-voltage driver.
- An embodiment may provide a modulator that will function over a wide range of optical wavelengths.
- An embodiment may provide a modulator that will function over a wide range of temperatures.
- An embodiment may provide a modulator that will function in high vacuum.
- An embodiment may be operated as a phase shifter (e.g. by holding elements static in a desired configuration—a phase shifter embodiment may provide a control for setting a distance of the static elements from the substrate; the elements may selectively be held in a mirror configuration or a grating configuration for example).
- An embodiment may provide an optical switch (e.g. the elements may selectively be held in a mirror configuration or a grating configuration).

Where a component (e.g. a member, power supply, lens, mirror, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

As will be apparent to those skilled in the art in the light of the foregoing disclosure, many alterations and modifications are possible in the practice of this invention without departing from the spirit or scope thereof. For example:
- Arrays for use in embodiments of the invention may comprise two-dimensional arrays of movable elements instead of one-dimensional arrays as in some of the embodiments described above.
- If a frequency-shifting diffuser is sufficient for an application then apparatus as described herein may be provided in which the members of different groups of elements are randomly or quasi-randomly distributed across an array. Such elements, may be driven according to sawtooth motion profiles with the phases of the sawtooth motion profiles being different for different groups of elements. Each group of elements may include one or more elements. In such embodiments it is not mandatory that the groups each include the same number of elements.
- In some embodiment, elements 12 in different parts of an array 11 may be driven to provide different frequency-shifts and/or different phase shifts. For example, a modulator as described herein may be pixelated. Each pixel may comprise one or more elements operated to provide different predetermined or individually selectable or individually controllable frequency shifts to light incident on the pixel.
- Motion profiles having waveforms other than the sawtooth and sinusoidal waveforms described above may be employed. For the case where the elements of an array are driven in N interleaved groups, with N>2 virtually any periodic waveform will work to some extent, if phased to give a "traveling" profile. The sawtooth and sinusoids are particularly useful cases. The sinusoid is particularly useful in some applications because only one harmonic is present and this facilitates driving an element at high frequency and bandwidth. The sawtooth is particularly useful in some applications because it can offer high efficiency with most power in m=1. In cases where the elements are not driven to provide a "traveling" profile (e.g., N=1, N=2, or random distribution of groups) then a sawtooth waveform is ideal but any reasonable approximation having a "significant period of motion at a roughly constant speed" could be used.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A modulator for modulating a frequency of an incident beam of light, the modulator comprising:
   an element having a light-reflective surface, the element movable to displace the surface in a first direction making an angle $\alpha$ with a direction of the incident beam of light wherein $\cos \alpha > 0$; and,
   a driving system configured to oscillate the element in the first direction according to a sawtooth motion profile to produce an output beam of light having a shifted frequency.

2. A modulator according to claim 1 wherein the sawtooth motion profile has an amplitude of $\lambda/4 \cos \alpha$ or an integer multiple thereof where $\lambda$ is the wavelength of light in the incident beam.

3. A modulator according to claim 1 wherein the driving system comprises a signal generator connected to apply a periodically-varying voltage to the element, the voltage causing the element to experience an electrostatic force.

4. A modulator according to claim 3 wherein the voltage output by the signal generator increases in proportion to the square root of time during at least a portion of a cycle.

5. A modulator according to claim 3 wherein the voltage has a time-averaged value of substantially zero over an integral number of cycles.

6. A modulator according to claim 1 wherein the element constitutes one of a plurality of elements each having a light-reflective surface, wherein the elements are arranged in an array.

7. A modulator according to claim 6 wherein each of the plurality of elements comprises an elongated element having a length significantly greater than a width, wherein the elements are arranged parallel to one another.

8. A modulator according to claim 7 wherein the driving system is configured to oscillate the plurality of elements in unison.

9. A modulator according to claim 7 wherein the driving system is configured to oscillate the plurality of elements in a plurality of groups, the elements of each of the groups being driven in unison according to a sawtooth motion profile wherein the sawtooth motion profiles for different ones of the groups are time-shifted relative to one another.

10. A modulator according to claim 9 wherein there are N groups, wherein N is an integer and $N \geq 2$.

11. A modulator according to claim 10 wherein the sawtooth motion profiles for different ones of the groups are time-shifted relative to one another by 1/N cycles of the sawtooth motion profiles.

12. A modulator according to claim 11 wherein each of the groups has substantially the same number of elements.

13. A modulator according to claim 9 wherein the elements of the groups are interleaved with one another.

14. A modulator according to claim 7 comprising a bus electrically connecting a plurality of the elements together wherein the elements are movable in response to changes in a voltage applied to the bus.

15. A modulator for modulating an incident beam of light, the modulator comprising:
   a plurality of elements, each element having a light-reflective surface, wherein the elements are grouped into N>2 groups such that the elements of the N groups are interleaved;
   means for selectively deflecting the elements of each group such that the incident beam of light is diffracted; and
   means of varying the deflection of the elements in time in an N-phase fashion
   wherein the number of groups N is equal to three and wherein the elements of the second group oscillate delayed by one-third period from the elements of the first group and the elements of the third group oscillate advanced by one-third period from the elements of the first group.

16. A modulator for modulating an incident beam of light, the modulator comprising:
   a plurality of elements, each element having a light-reflective surface, wherein the elements are grouped into N>2 groups such that the elements of the N groups are interleaved;
   means for selectively deflecting the elements of each group such that the incident beam of light is diffracted; and
   means of varying the deflection of the elements in time in an N-phase fashion
   wherein the number of groups N is equal to four and wherein the elements of the second group oscillate delayed by one-quarter period from the elements of the first group and the elements of the third group oscillate delayed by one-half period from the elements of the first group and the elements of the third group oscillate advanced by one-quarter period from the elements of the first group.

17. A modulator according to claim 15 wherein adjacent elements are spaced from one another by a gap such that the extent of each reflective surface is larger than each gap.

18. A modulator according to claim 15 wherein the deflection of the elements is substantially sinusoidal in time.

19. A modulator according to claim 15 wherein the deflection of the elements is substantially a sawtooth in time.

20. A modulator for modulating an incident beam of light, the modulator comprising:
   a plurality of elements, each element having a light-reflective surface, wherein the elements are grouped into N>2 groups such that the elements of the N groups are interleaved;
   means for selectively deflecting the elements of each group such that the incident beam of light is diffracted; and
   means of varying the deflection of the elements in time in an N-phase fashion
   wherein the deflection of the elements is substantially a sawtooth in time and
   wherein the peak-to-peak amplitude of the sawtooth is an integer multiple of one half of the wavelength of light in the incident beam of light.

21. A modulator according to claim 15 wherein the elements comprise ribbons supported at ends thereof.

22. A modulator according to claim 15 wherein the elements comprise cantilevered elements.

23. A modulator according to claim 15 comprising piezoelectric actuators coupled to move the elements.

24. A modulator according to claim 15 wherein the reflective surface of each element is blazed.

25. An apparatus comprising:
   a plurality of elongated elements arranged parallel to one another in a one dimensional array, each element having a light-reflective surface which is moveable in a first direction; and,
   a driving system operatively coupled to the elements and configured to oscillate the elements in the first direction according to a periodic motion profile phase-shifted by an amount depending on a position of the element along the array such that the elements define traveling wave.

26. An apparatus according to claim 25 comprising an optical system configured to receive an incident beam of light, direct the incident beam onto the array and receive a frequency-shifted output beam of light from the array.

27. An apparatus according to claim 26 wherein the optical system is configure to direct the frequency-shifted output beam along substantially the same direction of propagation as the incident beam.

28. A method for shifting the frequency of light in a beam of light, the method comprising:
   directing the beam of light onto an array of movable elements that each have a light-reflective surface, the elements movable to displace the surface in a first direction making an angle α with a direction of the beam of light wherein cos α>0; and
   oscillating the elements according to a periodic motion profile having a sawtooth waveform.

29. A method according to claim 28 wherein directing the beam of light onto the array comprises directing the beam of light normally onto the array.

30. A method according to claim 28 wherein the array comprises a row of the elements and oscillating the elements comprises oscillating alternating elements out of phase with one another.

31. A method for shifting the frequency of light in a beam of light, the method comprising:

directing the beam of light onto elements of an array of movable elements that each have a light-reflective surface, the elements movable to displace the surface in a first direction that is not perpendicular to a direction of propagation of the light beam; and oscillating each of the elements according to a periodic motion profile phase-shifted by an amount depending on a position of the element along the array so that the elements define traveling wave.

32. A method according to claim 31 wherein the periodic motion profile comprises a sinusoidal motion profile.

33. A method according to claim 31 wherein the periodic motion profile comprises a sawtooth motion profile.

* * * * *